United States Patent
Salcedo et al.

(10) Patent No.: US 8,320,091 B2
(45) Date of Patent: Nov. 27, 2012

(54) APPARATUS AND METHOD FOR ELECTRONIC CIRCUIT PROTECTION

(75) Inventors: Javier A. Salcedo, North Billerica, MA (US); Colin McHugh, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 426 days.

(21) Appl. No.: 12/731,969

(22) Filed: Mar. 25, 2010

(65) Prior Publication Data
US 2011/0235228 A1    Sep. 29, 2011

(51) Int. Cl.
*H02H 9/00* (2006.01)
(52) U.S. Cl. ............... 361/56; 361/91.1; 361/111
(58) Field of Classification Search .......... 361/56, 361/91.1, 111
See application file for complete search history.

(56) References Cited

U.S. PATENT DOCUMENTS

| | | | |
|---|---|---|---|
| 5,835,328 | A | 11/1998 | Maloney et al. |
| 6,429,489 | B1 | 8/2002 | Botula et al. |
| 6,442,008 | B1 | 8/2002 | Anderson |
| 7,064,393 | B2 * | 6/2006 | Mergens et al. ............ 257/360 |
| 7,102,862 | B1 | 9/2006 | Lien et al. |
| 7,738,222 | B2 * | 6/2010 | Deutschmann et al. ....... 361/56 |
| 2002/0153571 | A1 * | 10/2002 | Mergens et al. ............ 257/358 |
| 2004/0114288 | A1 | 6/2004 | Cheng, et al. |
| 2006/0103998 | A1 | 5/2006 | Smith |
| 2007/0076338 | A1 | 4/2007 | Traynor et al. |
| 2008/0304191 | A1 | 12/2008 | Riviere et al. |

FOREIGN PATENT DOCUMENTS
WO    WO 2009/050641    4/2009

OTHER PUBLICATIONS

Salcedo et al., Electrostatic Discharge Protection Framework for Mixed-Signal High Voltage CMOS Applications, IEEE Xplore, downloaded Feb. 23, 2010 at 12:53 Est.
Search Report and Written Opinion in PCT/US2011/029054, dated Sep. 8, 2011.

* cited by examiner

*Primary Examiner* — Rexford Barnie
*Assistant Examiner* — Tien Mai
(74) *Attorney, Agent, or Firm* — Knobbe Martens Olson & Bear LLP

(57) ABSTRACT

Apparatus and methods for electronic circuit protection are disclosed. In one embodiment, an actively-controlled protection circuit includes a detector, a timer, a current source and a latch. The detector is configured to generate a detection signal when the detector determines that a transient signal satisfies a first signaling condition. The timer is configured to receive the detection signal, and to generate a current control signal. The current control signal is provided to a current source, which produces a trigger current at least partly in response to the control signal. The trigger current is provided to a node of the latch, thereby enhancing the conductivity modulation of the latch and selectively controlling the activation voltage of the latch.

33 Claims, 11 Drawing Sheets

APPARATUS AND METHOD FOR ELECTRONIC CIRCUIT PROTECTION

BACKGROUND

1. Field

Embodiments of the invention relate to electronic systems, and more particularly, to transient signal protection circuits.

2. Description of the Related Technology

Certain electronic systems can be exposed to a transient signal event, or an electrical signal of short duration having rapidly changing voltage and high power. Transient signal events can include, for example, electro static discharge (ESD) events arising from the abrupt release of charge from an object or person to an electronic system.

Transient signal events can destroy integrated circuits (ICs) due to overvoltage conditions and high levels of power dissipation in relatively small areas of the ICs. High power dissipation can increase IC temperature, and can lead to numerous problems, such as gate oxide punch-through, junction damage, metal damage, and surface charge accumulation. Thus, there is a need for providing protection over ICs in an electronic system from such transient signal events.

SUMMARY

In one embodiment, an apparatus comprises a detector, a timer, a current source, and a latch. The detector is configured to detect a presence of a transient signal at a first node and to activate a detected state of a detection signal upon detection of the transient signal. The timer is configured to activate a control signal for a first duration of time based at least partly on a state of the detection signal. The current source is configured to modify a trigger current at least partly in response to a state of the control signal, wherein the trigger current can be modified to at least two different current levels. The latch has a low-impedance state and a high-impedance state. The latch is configured to receive the trigger current as an input, and to conduct a latch current from the first node to a second node when the latch is in the low-impedance state. The latch is further configured to transition from the high-impedance state to the low-impedance state for a first activation voltage of the transient signal when the trigger current is at a first current level and to transition from the high-impedance state to the low-impedance state for a second activation voltage of the transient signal when the trigger current is at a second current level having a magnitude greater than the first current level, and wherein the first activation voltage is greater than the second activation voltage.

In another embodiment, a method is provided for transient signal protection. The method comprises detecting the presence of a transient signal, activating a control signal for a first duration of time at least partly in response to the transient signal, and providing the control signal to a current source. The method further comprises modifying a trigger current of the current source at least partly in response to the control signal, wherein the trigger current can be modified to at least two different current levels. The method further comprises providing a latch having a low-impedance state and high-impedance state. The method further comprises providing at least a portion of the trigger current into the latch, wherein the latch is configured to transition from the high-impedance state to the low-impedance state for a first activation voltage of the transient signal when the trigger current is at a first current level and to transition from the high-impedance state to the low-impedance state for a second activation voltage of the transient signal when the trigger current is at a second current level having a magnitude greater than the first current level, and wherein the first activation voltage is greater than the second activation voltage.

DETAILED DESCRIPTION OF EMBODIMENTS

Figure 1:
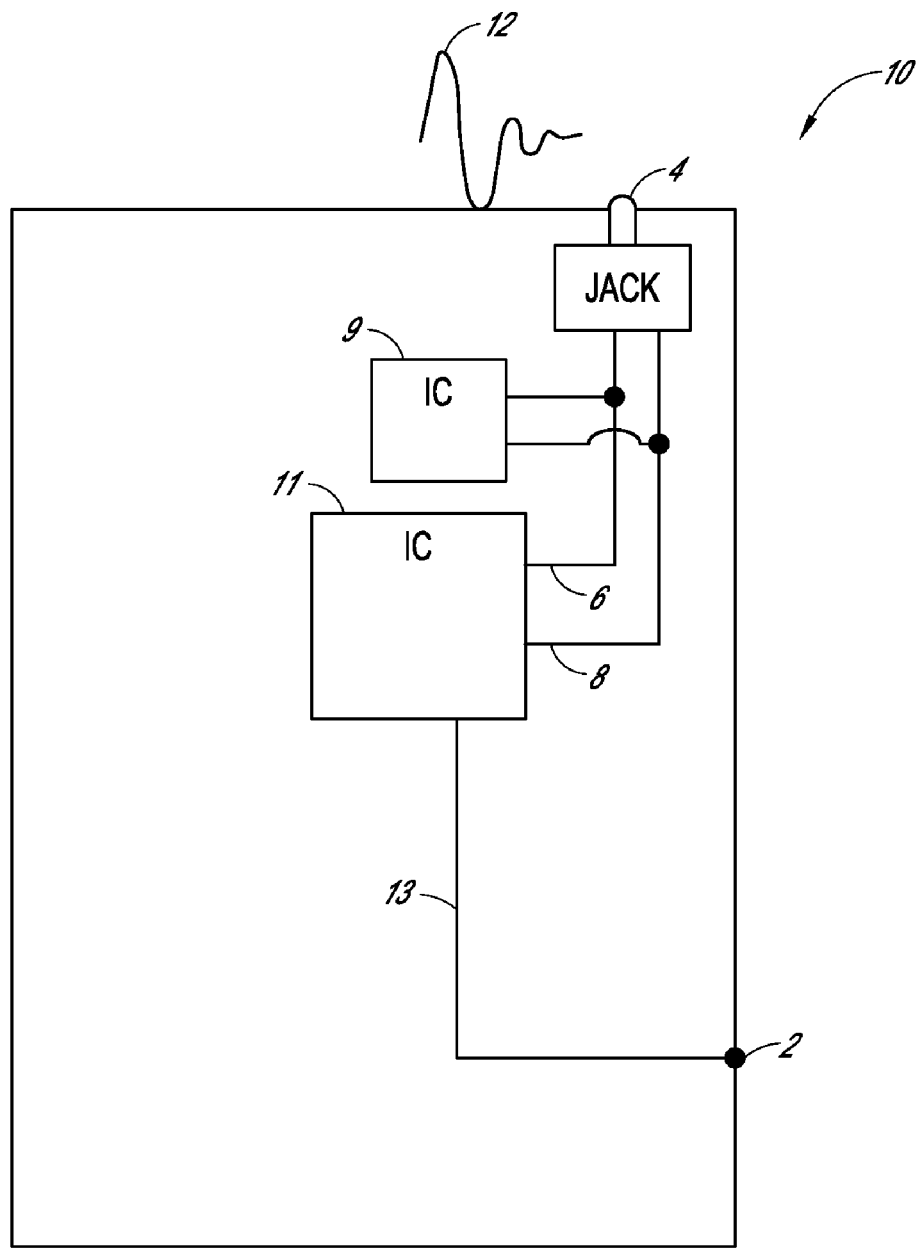
FIG. 1 is a schematic block diagram of an electronic system in accordance with one embodiment.

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

Certain electronic systems are configured to protect components therein from transient signal events. Furthermore, to help guarantee that an electronic system is reliable, manufacturers can test the electronic system under defined stress conditions, which can be described by standards set by various organizations, such as the Joint Electronic Device Engineering Council (JEDEC) and the International Electrotechnical Commission (IEC). The standards can cover a wide multitude of transient signal events, including a relatively low energy JEDEC 22-A114-B Human Body Model ESD transient signal event to a relatively higher energy transient signaling event associated with system-level ESD immunity, such as described by the IEC 61000-4-2 standard. Electronic systems can include a number of discrete components, such as discrete inductors or capacitors, to protect ICs or other sensitive electronics from certain transient signal events.

There is a need for an integrated circuit (IC) in an electronic system to be configured to withstand certain transient signal events without the need for discrete protection components external to the IC. Moreover, there is a need for an IC having a protection circuit which is actively-controlled so that protection is provided under preselected conditions in a controlled manner. Furthermore, there is a need for an IC to be configured to handle transient signal events associated with direct contact to the external world, such as, for example, transient signal events originating from a headphone (HP) jack or defined by, for example, the IEC 61000-4-2 standard.

Overview of Electronic Systems

FIG. 1 is a schematic block diagram of an electronic system 10 in accordance with one embodiment. The illustrated electronic system 10 includes a pin 2, a jack 4, a first IC 9 and a second IC 11. The jack 4 can include, for example, an HP jack and can be configured to receive an insertable tip. As illustrated in FIG. 1, the jack 4 can provide first and second signals 6, 8 to, for example, the first and second ICs 9, 11. The pin 2 can be configured to provide a signal 13 from outside the electronic system 10 to, for example, the IC 11.

The ICs 9, 11 can be employed in transmission line systems, industrial control, microelectromechanical system (MEMS) sensors, transducers, or a variety of other systems. The ICs 9, 11 can be utilized in electronic systems in which pins of the ICs are exposed to user contact through a low-impedance connection.

The jack 4 and/or the pin 2 can receive a transient signal event 12. In some instances, the transient signal event can be, for example, an event described by the IEC 61000-4-2 standard. Skilled artisans will appreciate that the IEC 61000-4-2 is a systems level ESD test specification defining voltage stress levels for contact-discharge testing and air-discharge testing typically in the range of about 2 kV to 15 kV, with special discharge testing having voltage stress levels of up to about 30 kV.

IC Protection Circuits

In some embodiments, one or more protection circuits can be employed in an IC (e.g., 11) and can be configured to provide transient signal protection to one or more internal circuit of the IC. The protection circuit can be configured to divert the current of the transient signal event, thereby providing transient signal protection, as will be described below. The current can be diverted from a pin or pad of the IC to another pin, pad or electrical node of the IC. When no transient signal event is detected, the protection circuit can remain in a high-impedance/low-leakage state, thereby reducing static power consumption. The protection circuit can be configured to transition to a low-impedance state during a transient signal event, as will be described below. In another embodiment, one or more protection circuits can be employed in one IC, such as the first IC 9, and can be configured to provide transient signal protection to another component, such as the second IC 11. Thus, for example, one or more protection circuits can be employed in a first IC 9 and can provide protection to circuits in the second IC 11. The first IC 9 can be physically separated from the second IC 11, or it can be encapsulated into a common or unitary package with the second IC 11. Thus, one or more protection circuits can be placed in a stand-alone IC, in a common package for system-on-a-package applications, or integrated with an IC for system-on-a-chip applications.

Figure 2A:
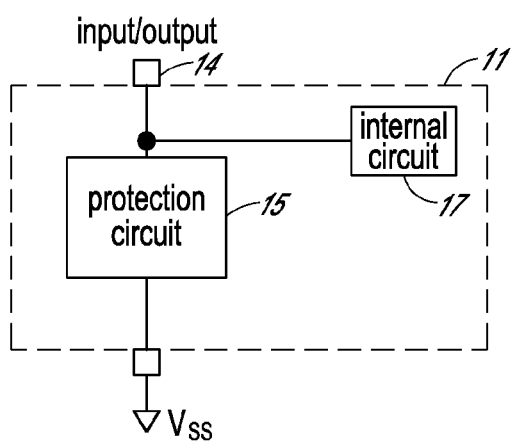
FIG. 2A illustrates an environment in which an embodiment of the invention can be used.

FIG. 2A illustrates an environment in which an embodiment of the invention can be used. The illustrated IC 11 can be at least part of the IC 11 in the electronic system 10 of FIG. 1. A skilled artisan will, however, appreciate that the IC 11 of FIG. 2A can be part of any other electronic system.

The IC 11 can include an input/output pad 14, a protection circuit 15, and an internal circuit 17. As shown in FIG. 2, the input/output pad 14, the protection circuit 15, and the internal circuit 17 can be configured to be electrically connected to one another. The IC 11 can be configured to include additional components, such as, for example, one or more intervening resistors between the input/output pad 14 and the internal circuit 17.

The input/output pad 14 can be configured to receive one or more signals from one or more components of an electronic system to which the pad 14 belongs, and/or to output one or more signals to the one or more components. The input/output pad 14 can be electrically coupled to a jack (for example, the jack 4 of FIG. 1) or a pin (for example, the pin 2 of FIG. 1) of the electronic system. Thus, the input/output pad 14 may receive a transient signal event (for example, the event 12 of FIG. 1), which can be potentially damaging to one or more portions of the IC 11.

The protection circuit 15 can be provided to protect the internal circuit 17 from, for example, a transient signal event having positive voltage amplitude with respect to a first voltage reference $V_{SS}$. As will be described in detail below, the transient signal event can be received on the input/output pad 14, and a portion of a current associated with the transient signal event can be shunted to the first voltage reference $V_{SS}$. The first voltage reference $V_{SS}$ can include, for example, a ground node of the IC 11 connected to one or more ground pads, and can be configured to have low impedance, thereby enhancing the IC's protection against a transient signal event. Although FIG. 2A illustrates the first voltage reference $V_{SS}$ as being connected to a ground pad of the IC 11, skilled artisans will appreciate that the first voltage reference $V_{SS}$ need not be connected to a pad of the IC 11. For example, the first voltage reference $V_{SS}$ can be an internally generated voltage reference configured to receive a large current without damage.

Figure 2C:
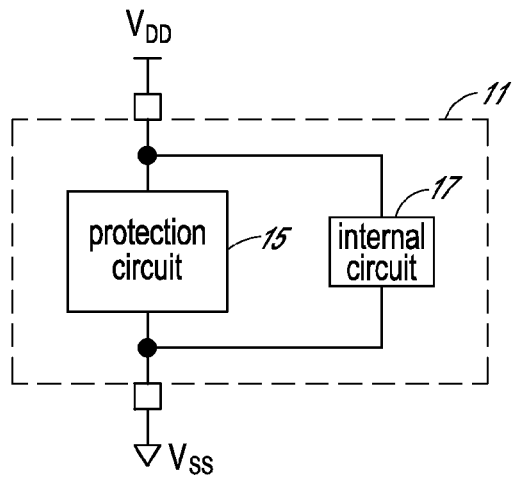
FIG. 2C illustrates yet another environment in which an embodiment of the invention can be used.
Figure 2B:
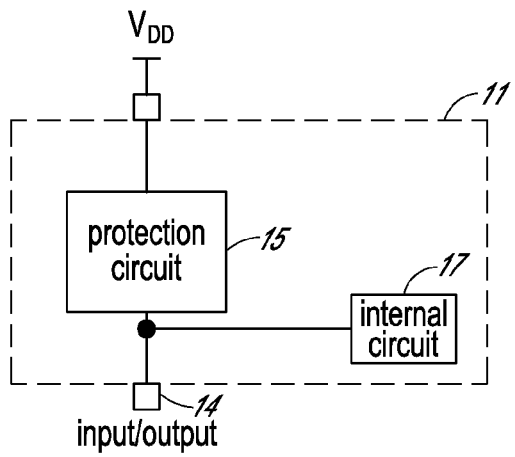
FIG. 2B illustrates another environment in which an embodiment of the invention can be used.

FIG. 2B illustrates another environment in which an embodiment of the invention can be used. The illustrated IC 11 includes input/output pad 14, the protection circuit 15, and the internal circuit 17. As shown in FIG. 2B, the protection circuit 15 can be configured to electrically connect between a second voltage reference $V_{DD}$ and the input/output pad 14. The protection circuit 15 can be configured to provide protection against a transient signal event received at the input/output pad 14. For example, if the transient signal event received at the input/output pad 14 includes a signal having a negative voltage amplitude with respect to the second voltage reference $V_{DD}$, a current path can be provided from the second voltage reference $V_{DD}$ to the input/output pad 14. The second voltage reference $V_{DD}$ can include, for example, a power node of the IC 11 connected to one or more power pads, which can be configured to have low impedance, thereby enhancing the IC's protection against a transient signal event. Other details of the input/output pad 14, the protection circuit 15, and the internal circuit 17 can be as described above in connection with FIG. 2A.

FIG. 2C illustrates yet another environment in which an embodiment of the invention can be used. The illustrated IC 11 includes the internal circuit 17 and the protection circuit 15, each electrically connected between a first voltage reference $V_{SS}$ and a second voltage reference $V_{DD}$. The protection circuit 15 can be configured to provide protection against a transient signal event received at the first voltage reference $V_{SS}$ and/or the second voltage reference $V_{DD}$. For example, in a manner similar to that described above with reference to FIG. 2A, the protection circuit 15 can be configured to shunt a current from the second voltage reference $V_{DD}$ to the first voltage reference $V_{SS}$ when the protection circuit detects a transient signal event having positive voltage amplitude on the second voltage reference $V_{DD}$. Likewise, in a manner similar to that described above with reference to FIG. 2B, the protection circuit 15 can be configured to provide a current path from the second voltage reference $V_{DD}$ to the first voltage reference $V_{SS}$ when the protection circuit detects a transient signal event having negative voltage amplitude on the first voltage reference $V_{SS}$. Although the first voltage reference $V_{SS}$ and the second voltage reference $V_{DD}$ can be low impedance and can be configured to each conduct a relatively large amount of current without damage, the protection circuit 15 can enhance protection against transitory signal events by providing a current path between a plurality of low impedance nodes.

Figure 2D:
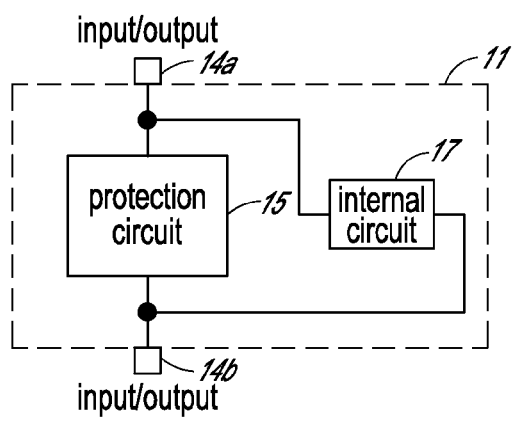
FIG. 2D illustrates yet another environment in which an embodiment of the invention can be used.

FIG. 2D illustrates yet another environment in which an embodiment of the invention can be used. The illustrated IC 11 includes the internal circuit 17 and the protection circuit 15, each electrically connected between a first input/output pad 14a and a second input/output pad 14b. Although the internal circuit 17 is shown as connecting to both the first and second input/output pads 14a, 14b, skilled artisans will appreciate that a protection circuit 15 can be employed in the configuration shown in FIG. 2D even when the internal circuit 17 is electrically connected to only one of the first and second input/output pads 14a, 14b. The protection circuit 15 can enhance protection against transitory signal events by shunting the current associated with the transitory signal on the first input/output pad 14a and/or the second input/output pad 14b in a manner similar to that described above with reference to FIGS. 2A-2C. Other details of the input/output pads 14a, 14b and the protection circuit 15 can be as described above in connection with FIG. 2A.

Persons of ordinary skill in the art will appreciate that one or more of the above configurations of protection circuits can be employed on a single IC in order to provide the desired degree of protection against various transient signal events. For example, an IC can include a number of input pads, output pads, bi-directional pads, power pads, and ground pads. One or more of these pads can have multiple instantiations of the protection circuit 15, and a single pad can have multiple protection circuits 15. For example, a single input and/or output pad can have protection circuits described above in connection with one or more of FIGS. 2A, 2B, and 2D.

As can be seen in FIGS. 2A-2D, the protection circuit 15 can be positioned along a signal path, such as the signal path between the input/output pad 14 and the internal circuit 17. In order to minimize an adverse effect on the speed of the signal path, it can be desirable for the protection circuit 15 to provide a minimal amount of capacitive loading to the signal path. Additionally, it can be desirable for the protection circuit 15 to have an off state in which the circuit conducts at most a relatively small current, in order to minimize leakage power dissipation and static power consumption. This can be desirable, for example, in a mobile application in which battery life is an important consideration in the quality of the mobile device.

It can also be desirable for the protection circuit 15 to conduct a large current when a transient signal event satisfying one or more signaling conditions indicative of, for example, high-voltage or high-power is detected. Thus, there is a need for a protection circuit having a relatively small capacitive loading and circuit area, and whose impedance can be modulated by several orders of magnitude over a short amount of time. Additionally, there is a need for a protection circuit configured to conduct a large current at an activation voltage which can be selectively controlled. In particular, it can be desirable to induce conduction at a particular activation voltage in a controlled manner, thereby shunting the charge associated with a high-voltage transient signal event before the IC is exposed to overvoltage conditions or localized power dissipation.

Figure 3:
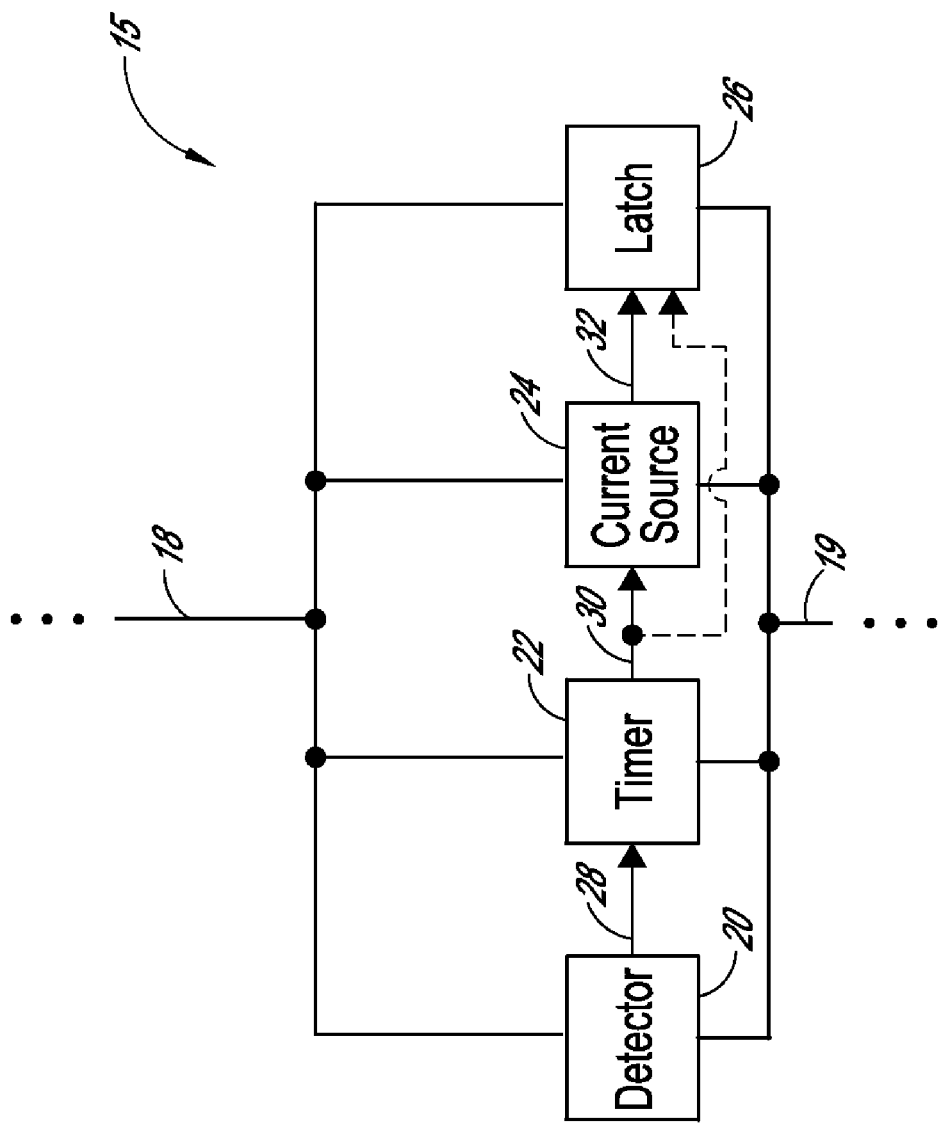
FIG. 3 is a schematic block diagram illustrating an active-controlled protection circuit in accordance with embodiments.

FIG. 3 is a schematic block diagram illustrating an active-controlled protection circuit 15 in accordance with some embodiments. The illustrated protection circuit 15 includes a detector 20, a timer 22, a current source 24, and a latch 26. As shown in FIG. 3, the detector 20 can be configured to provide a detection signal 28 to the timer 22, which in turn can provide a control signal 30 to the current source 24 and, optionally, the latch 26. The control signal 30 can be used by the current source 24 to generate a trigger current 32, which can aid in enhancing the conductivity of the latch 26 and in controlling the activation voltage at which the latch 26 transitions to a low-impedance state, as will be described in detail below.

The protection circuit 15 also includes a first node 18 and a second node 19, which can electrically connect one or more of the detector 20, the timer 22, the current source 24, and the latch 26 to other nodes or pads of an IC to achieve, for example, any one of the configurations illustrated in FIGS. 2A-2D. Although the detector 20, the timer 22, the current source 24, and the latch 26 are shown as each connected to first and second nodes 18, 19, in certain embodiments, the illustrated connections are not necessary. For example, the first node 18 is not provided to the current source 24 in the embodiment shown in FIG. 4. Furthermore, in certain embodiments, additional connections can be present.

As will be described in detail below, the latch 26 of the protection circuit 15 can be configured to begin in a low-leakage/high-impedance state (or OFF state). The OFF state impedance can be in, for example, the range of about 10 to 1,000 giga-ohms, thereby minimizing power consumption. Upon detection of a transient signal event satisfying one or more signaling conditions, the detector 20 can be configured to provide a detection signal 28 to the timer 22. The timer 22 can receive the detection signal 28, and can provide a current control signal 30 to the current source 24. The current source 24 can use the current control signal 30 to provide the latch 26 with a trigger current 32, which can be configured to enhance the conductivity of the latch 26. The trigger current 32 can also be used to selectively control the activation voltage at which the latch 26 transitions from the high-impedance state to a high-current/low-impedance state (or ON state). The ON state impedance can be in, for example, the range of about 0.1 to 2 ohms, thereby aiding in protecting an IC from a transient signal event.

While the latch 26 is receiving the trigger current 32, the latch 26 can be configured to have enhanced conductivity modulation and have a selectively decreased activation voltage. Although the leakage current of the latch 26 can be increased while the latch 26 receives the trigger current 32, the expense of increased leakage is briefly endured during the moments leading up to a potentially IC-damaging transient signal event. Thus, after the transient signal event has passed, the latch 26 can be configured to return to the low-leakage/high-impedance state.

The detector 20 can be configured to detect a transient signal event on the first node 18 and/or second node 19, and to generate a detection signal 28 indicative of whether or not a qualifying transient signal event has been detected. For example, the detector 20 can be configured to provide the detection signal 28 when the detector 20 detects a rapidly changing voltage on the first node 18 and/or second node 19. In another embodiment, the detector 20 is configured to monitor the magnitude of the voltage on the first node 18 and/or second node 19 relative to a voltage threshold. Persons of ordinary skill in the art will appreciate that the detector 20 can be configured to monitor a transient signal, based on a multitude of detection conditions indicative of a transient signal's potential to damage sensitive electronics, including but not limited to, measurements of power, voltage, and/or charge. One embodiment of the detector 20 will be described below with reference to FIG. 8.

With continuing reference to FIG. 3, the timer 22 can be configured to receive the detection signal 28, and to provide the current control signal 30 to the current source 24. In one embodiment, the timer 22 is configured to generate the current control signal 30 while the detection signal 28 indicates that a qualifying transient signal event has been detected and for a duration thereafter. For example, the timer 22 can be configured to generate the current control signal 30 for a time period sufficient for the latch 26 to be stable in the low-impedance state. However, skilled artisans will recognize that the timer 22 can be configured to generate a current control signal 30 having a wide variety of timing characteristics.

As described above, it can be desirable for the impedance of the protective circuit 15 to change by several orders of magnitude over a short amount of time. Thus, it can be desirable for the latch 26 to transition between the high-impedance state and the low impedance state in a short amount of time, such as, for example, between about 0.1 and 10 ns, and at a voltage less than that associated with over-voltage conditions and damage to an IC. As will be described below with reference to FIGS. 4-9, the latch 26 can be configured to begin in the low-leakage/high-impedance state. Upon detection of a transient signal event satisfying one or more signaling conditions, the latch 26 can be configured to receive the trigger current 32, and thereby enter a state in which the activation voltage of the latch 26 is selectively decreased and the conductivity modulation of the latch 26 is enhanced. Thereafter, the voltage of the transient signal event can exceed the activation voltage of the latch 26, and the latch 26 can transition to the low-impedance state for the duration of the transient signal event. Various embodiments of the current source 24 and the latch 26 will now be described below with reference to FIGS. 4-7.

Figure 4:
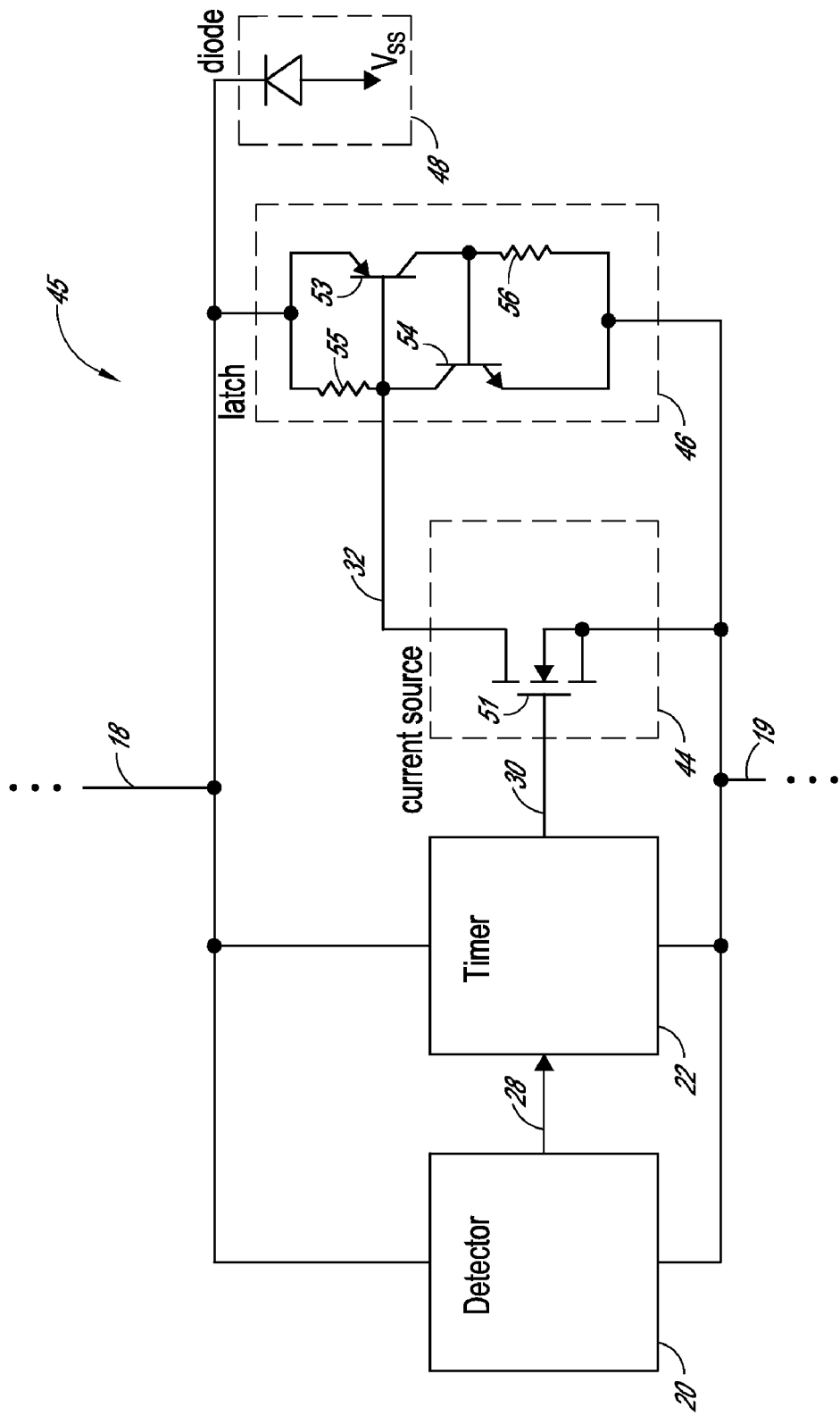
FIG. 4 is a circuit diagram illustrating an active-controlled protection circuit in accordance with one embodiment.

FIG. 4 is a schematic block diagram illustrating an active-controlled protection circuit 45 in accordance with one embodiment. The illustrated protection circuit 45 includes a detector 20, a timer 22, a current source 44, a latch 46, and a diode 48. The illustrated detector 20 is electrically connected to the first node 18 and the second node 19, and is configured to provide the detection signal 28 to the timer 22. The illustrated timer 22 is electrically connected to the first and second nodes 18, 19, and is configured to generate a current control signal 30, which is provided to the current source 44. The illustrated latch 46 is electrically connected to the first and second nodes 18, 19, and is configured to receive the trigger current 32. As illustrated in FIG. 4, the diode includes a cathode electrically connected to the first node 18, and an anode electrically coupled to the first voltage reference $V_{SS}$.

The protection circuit 45 can be configured to enter a low-impedance state at a selected activation voltage in response to a transient signal event satisfying one or more signaling conditions, as will be described. The detector 20 can be configured to detect a transient signal event on the first node 18 and/or second node 19, and to generate a detection signal 28 indicative of whether or not a transient signal event satisfying the signaling conditions has been detected. The timer 22 can be configured to receive the detection signal 28, and to provide the current control signal 30 to the current source 44. One embodiment of the detector 20 and the timer 22 will be described below with reference to FIG. 8.

The illustrated current source 44 includes an NMOS transistor 51 having a gate, drain, source and body. As shown in FIG. 4, the source and body can be electrically connected to the second node 19. In one embodiment, the body of the NMOS transistor 51 is isolated from the substrate by, for example, a deep n-well layer or buried n-type layer, thereby permitting the source and body of the NMOS transistor 51 to drop below the bias voltage of the substrate. The drain can be electrically connected to the latch 46, and configured to provide the trigger current to the latch 46, as will be described below. The gate of the transistor 51 can be electrically connected to the current control signal 30, which can be configured to selectively increase or decrease the voltage of the gate of the transistor 51, thereby controlling the flow of the trigger current 32. Persons of ordinary skill in the art will recognize that the illustrated transistor 51 is just one embodiment of the current source 44, and that a wide multitude of devices can be employed to create a current source, including, but not limited to, one or more of N and P type field-effect transistors, NPN and PNP bipolar transistors, JFETS, diodes, resistors, inductors and capacitors.

As shown in FIG. 4, the illustrated latch 46 includes a first bipolar transistor 53, a second bipolar transistor 54, a first resistor 55, and a second resistor 56. The first and second bipolar transistors 53, 54 each include an emitter, a base and a collector. In the illustrated embodiment, the first and second bipolar transistors 53, 54 are selected to be PNP and NPN transistors, respectively. The first resistor 55 includes a first end electrically connected to the first node 18 and to the emitter of the first bipolar transistor 53, and a second end electrically connected to the base of the first bipolar transistor 53, the collector of the second bipolar transistor 54, and to the portion of the current source 44 providing the trigger current 32. The second resistor 56 includes a first end electrically connected to the collector of the first bipolar transistor 53 and to the base of the second bipolar transistor 54, and a second end electrically connected to the emitter of the second bipolar transistor 54 and to the second node 19.

As skilled artisans will appreciate, the first and second bipolar transistors 53, 54 are configured to be in feedback. At a certain level of the collector current of the first bipolar transistor 53, the feedback between the first and second bipolar transistors 53, 54 can be regenerative and cause the latch 46 to enter a low-impedance or ON state. Since an increase in the voltage of the transient signal event can lead to an increase in the collector current of the first bipolar transistor 53, at a certain transient signal event voltage, denoted as the activation voltage, the transient signal event can induce the latch 46 into the low-impedance state. The activation voltage can be a function of a variety of factors, including the geometries of the first and second bipolar transistors 53, 54, the common-emitter gain, "β" of the bipolar transistors, or the resistance of the first and second resistors 55, 56. It can be desirable to be able to select a desired activation voltage so that the latch 46 can enter a low-impedance state in a controlled manner, thus shunting the charge associated with a transient signal event before the IC is exposed to damaging conditions.

In response to the trigger current 32, the illustrated latch 46 can be configured to transition from a low-leakage/high-impedance off-state to a high-impedance state in which the conductivity of the latch 46 is enhanced and the activation voltage of the latch 46 is decreased. Once in a state of enhanced conductivity modulation and selectively decreased activation voltage, the latch 46 can thereafter transition to the low-impedance state in response to the voltage of the transient signal event crossing the activation voltage of the latch 46. As will be described below, the trigger current 32 can enhance the conductivity modulation of the latch 46 and can selectively control the activation voltage of the latch 46.

In one embodiment, the current source 44 of the protection circuit 45 is configured to inject the trigger current 32 into the latch 46 when a transient signal event satisfying one or more signaling conditions is detected. The trigger current 32 includes a first portion which is directed through the first resistor 55 and which can be configured to forward bias the p-n junction between the emitter and base of the first bipolar transistor 53, thereby stimulating an amplified flow of current from the collector of the first bipolar transistor 53. The trigger current 32 can also include a second portion which is provided to the base of the transistor 53, which can be configured to stimulate the base current of the first bipolar transistor 53, which can lead to a further increase of the collector current of the first bipolar transistor 53. Skilled artisans will appreciate that as the collector current of the first bipolar transistor 53 increases, a first portion of the collector current can be provided to the base of the second bipolar transistor 54, and a second portion can be provided to the second resistor 56, thereby increasing the voltage of the p-n junction of the emitter and base of the second bipolar transistor 54. Thus, the collector current of the second bipolar transistor 54 can increase, which in turn can be configured to further stimulate the collector current of the first bipolar transistor 53, both by increasing the bias the p-n junction between the emitter and base of the first bipolar transistor 53 and increasing the base current of the first bipolar transistor 53.

As described above, the trigger current 32 can increase the collector current in the first bipolar transistor 53, and therefore control the activation voltage of the latch 46. Additionally, the trigger current 32 increases the conductivity modulation of the latch 46, for example, the change in impedance of the latch in response to a change in a voltage. Once a voltage of the transient signal event exceeds a threshold and the latch 46 enters the low-impedance state, the latch 46 can remain in the low-impedance state for the duration of the transient signal event, even if the trigger current 32 is removed. By selecting the trigger current 32 to have a current level corresponding to a desired activation voltage, the protection circuit 45 can be configured to protect an IC from a variety of high-energy and high-speed transient signal events.

The illustrated latch 46 can be configured to draw a relatively large current from the first node 18 and to provide the current to the second node 19. In one example (FIG. 2A), the first node 18 can be electrically coupled to an internal circuit that needs protection from the voltage and power associated with such a large current. Thus, the illustrated latch 46 can provide protection over the internal circuit from a transient signal event received on the first node 18 having positive voltage amplitude relative to the second node 19.

In another example (FIG. 2B), the second node 19 may be electrically coupled to an internal circuit that needs protection from such a large current. In such an embodiment, the latch 46 can be configured to provide protection from a transient signal event received on the second node 19 having negative voltage amplitude relative to the first node 18.

To provide additional protection, such as to provide additional protection against a transient signal event received on the first node 18 having negative voltage amplitude relative to the second node 19, one or more additional protection circuits can be employed. For example, the protection circuit 45 can include the diode 48 having a cathode connected to the first node 18 and an anode connected to the second node 19. Skilled artisans will recognize that a variety of additional circuits can be employed to provide additional protection, including, but not limited to, diodes, field-effect transistors, bipolar transistors, and silicon controlled rectifiers.

Figure 5:
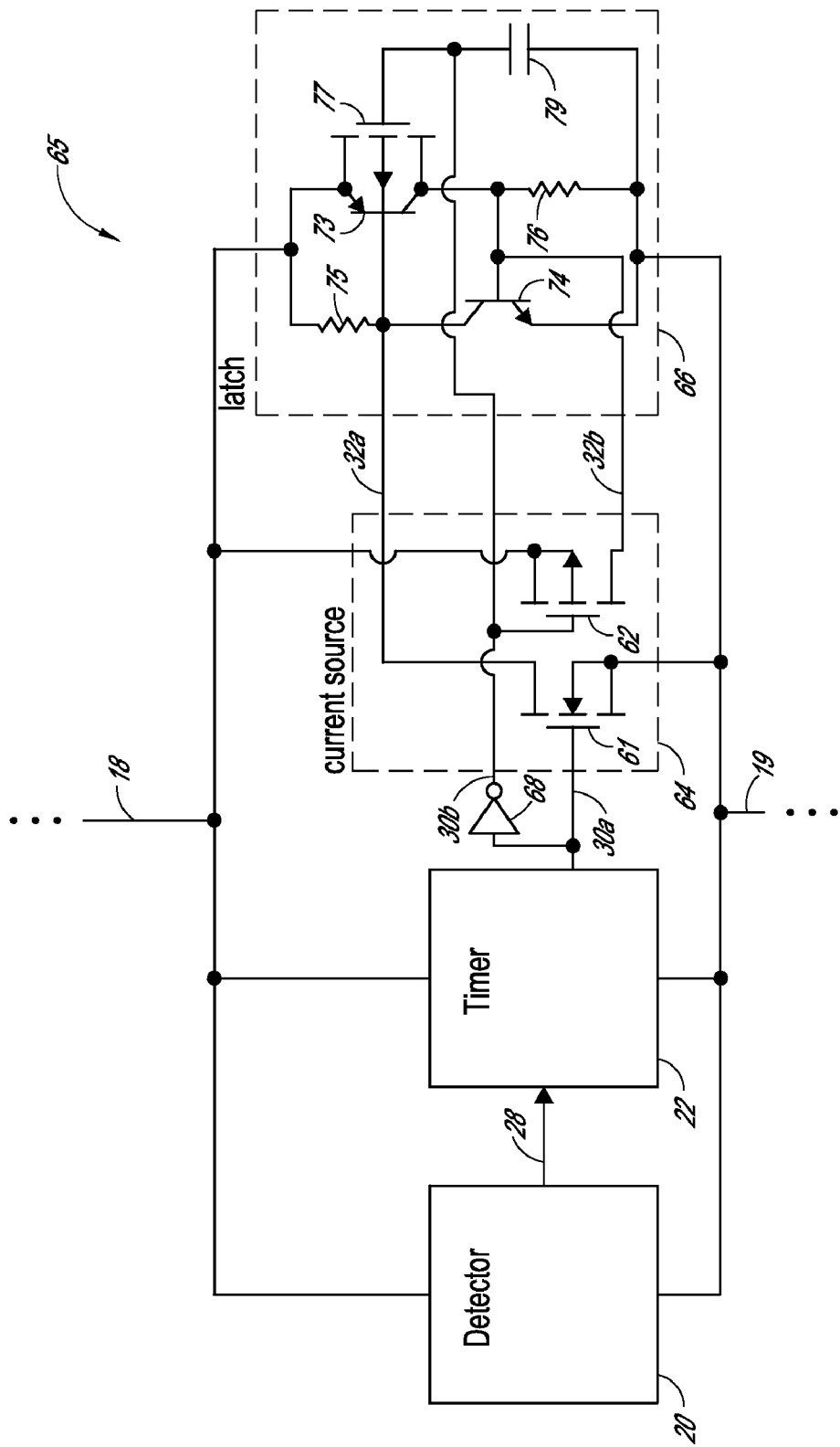
FIG. 5 is a circuit diagram illustrating an active-controlled protection circuit in accordance with another embodiment.

FIG. 5 is a schematic block diagram illustrating an active-controlled protection circuit 65 in accordance with another embodiment. The illustrated protection circuit 65 includes a detector 20, a timer 22, a current source 64, a latch 66, and an inverter 68.

The illustrated detector 20 is electrically connected to the first node 18 and the second node 19, and is configured to provide the detection signal 28 to the timer 22. The illustrated timer 22 is electrically connected to the first and second nodes 18, 19, and is configured to generate a first current control signal 30*a*, which is provided to the current source 64. Other details of the detector 20 and the timer 22 can be as described above in connection with FIGS. 3 and 4.

The inverter 68 includes an input adapted to receive the first current control signal 30*a*, and an inverting output configured to generate a second current control signal 30*b*. The inverter 68 provides the second current control signal 30*b* to the current source 64 and to the latch 66. Skilled artisans will appreciate that other control logic besides an inverter can provide the second current control signal 30*b* to the current source 64 or to the latch 66. For example, a logic gate such as a NAND or NOR gate can be employed.

The current source 64 is electrically connected to first and second nodes 18, 19, and can generate first and second trigger currents 32*a*, 32*b* in response to the current control signals 30*a* and 30*b*. The current source 64 includes a first current source transistor 61 and a second current source transistor 62 each having a gate, drain, source and body. The first and second current source transistors 61, 62 can, but need not, be selected to be NMOS and PMOS transistors, respectively. In one embodiment, the body of the first current source transistor 61 is isolated from the substrate by, for example, a deep n-well layer or n-type buried layer, thereby permitting the body of the first transistor 61 to be biased independently of the substrate. As shown in FIG. 5, the source and body of the first current source transistor 61 can be electrically connected to the second node 19, and the drain of the first current source transistor 62 can be electrically connected to a first node of the latch 66, as will be described below. The gate of the first current source transistor 61 can be configured to receive the first current control signal 30*a*, which can selectively increase or decrease the voltage of the gate of the first current source transistor 61, thereby controlling the flow of the first trigger current 32*a*. The source and body of the second current source transistor 62 can be electrically connected to the first node 18, and the drain of the second current source transistor 62 can be electrically connected to a second node of the latch 66, as will be described below. Persons of ordinary skill in the art will recognize that the illustrated first and second current source transistors 61, 62 are just one embodiment of the current source 64, and that a wide multitude of devices can be employed to create a current source as described above.

The latch 66 is electrically connected to the first and second nodes 18, 19, and is configured to receive first and second trigger currents 32*a*, 32*b*, as well as second current control signal 30*b*. The latch 66 can include a first bipolar transistor 73, a second bipolar transistor 74, a first resistor 75, a second resistor 76, a MOS transistor 77, and a capacitor 79. The first and second bipolar transistors 73, 74 each include an emitter, a base and collector, and the MOS transistor includes a gate, a drain, a source, and a body. In the illustrated embodiment, the first and second bipolar transistors 73, 74 are PNP and NPN transistors, respectively, and the first MOS transistor 77 is a PMOS transistor. In one embodiment, the emitter and the collector of the first bipolar transistor 73 is formed from p-type regions of the source and drain of the MOS transistor 77, and the base of the first bipolar transistor 73 is formed from the n-type body of the MOS transistor 77. Thus, the first bipolar transistor can be a parasitic device formed laterally underneath the MOS transistor 77 and can be configured to operate in parallel with the MOS transistor 77. However, skilled artisans will appreciate that the types of the transistors 73, 74, 77 can vary depending on the design of the circuit.

The first resistor 75 includes a first end electrically connected to the first node 18, the emitter of the first bipolar transistor 73, and the source of the MOS transistor 77, and a second end electrically connected to the base of the first bipolar transistor 73, to the collector of the second bipolar transistor 74, the body of the MOS transistor 77, and to the portion of the current source 64 providing the first trigger current 32a. The second resistor 76 includes a first end electrically connected to the collector of the first bipolar transistor 73, to the base of the second bipolar transistor 74, to the drain of the MOS transistor 77, and to the portion of the current source 64 providing the second trigger current 32b. The second resistor 76 further includes a second end electrically connected to the emitter of the second bipolar transistor 74, to the second node 19, and to a first end of the capacitor 79. The capacitor 79 also includes a second end, which is connected to the gate of the MOS transistor 77 and to the second current control signal 30b.

The illustrated latch 66 can be configured to have enhanced conductivity modulation and reduced activation voltage when the first and second trigger currents 32a, 32b are received. As described above with reference to FIG. 4, providing a first trigger current can reduce the activation voltage and enhance conductivity modulation. Furthermore, as will be described below, the second trigger current 32b, the MOS transistor 77 and the capacitor 79 can further enhance conductivity modulation of the latch 66 and further control the latch 66 activation.

The second trigger current 32b can decrease the activation voltage of the latch 66 and can increase the voltage band over which the latch 66 transitions from a high-impedance state to a low-impedance state. The second trigger current 32b can include a first portion which can stimulate the base current of the second bipolar transistor 74, which can produce an amplified collector current of the second bipolar transistor 74. The second trigger current 32b can also include a second portion which can increase the voltage across the p-n junction between the base and emitter of the second bipolar transistor 74, thereby further stimulating the collector current of the second bipolar transistor 74. The increased trigger current 32b of the second bipolar transistor 74 can subsequently increase the collector current of the second bipolar transistor 74, which in turn further increases the collector current of the first bipolar transistor 73. Thus, the second trigger current 32b can be configured to enhance the current flow in the feedback loop of the first and second bipolar transistors 73, 74, and thereby reduce the activation voltage at which the feedback becomes regenerative and the latch 66 enters the low-impedance state.

With continuing reference to FIG. 5, the latch 66 includes the MOS transistor 77, which is configured to receive the second current control signal 30b. The MOS transistor 77 can be configured to increase the current flowing to the base of the second bipolar transistor 74 and to increase the bias voltage of the p-n junction between the base and emitter of the second bipolar transistor 74, thereby enhancing the conductivity of the latch 66. Although the MOS transistor 77 is illustrated as being electrically connected in a manner identical to that of the second current source transistor 62, the MOS transistor 77 differs in that it can, but need not, be part of a separate physical layout or present in a configuration in which the current source 64 is implemented in another manner.

The capacitor 79 can be utilized to couple the voltage of the gate of the transistor 77 downward, thereby enhancing the channel current of the MOS transistor 77 and further enhancing the conductivity of the latch 66. For example, if the voltage on the second node 19 were to decrease suddenly in response to a transient signal event, the coupling provided by the capacitor 79 can decrease the voltage at the gate of the PMOS transistor 77, thereby increasing the current conducted by the PMOS transistor 77. As described above, the increased current can also stimulate the second bipolar transistor 74, thereby controlling the activation voltage of the latch and enhancing conductivity modulation.

Figure 6A:
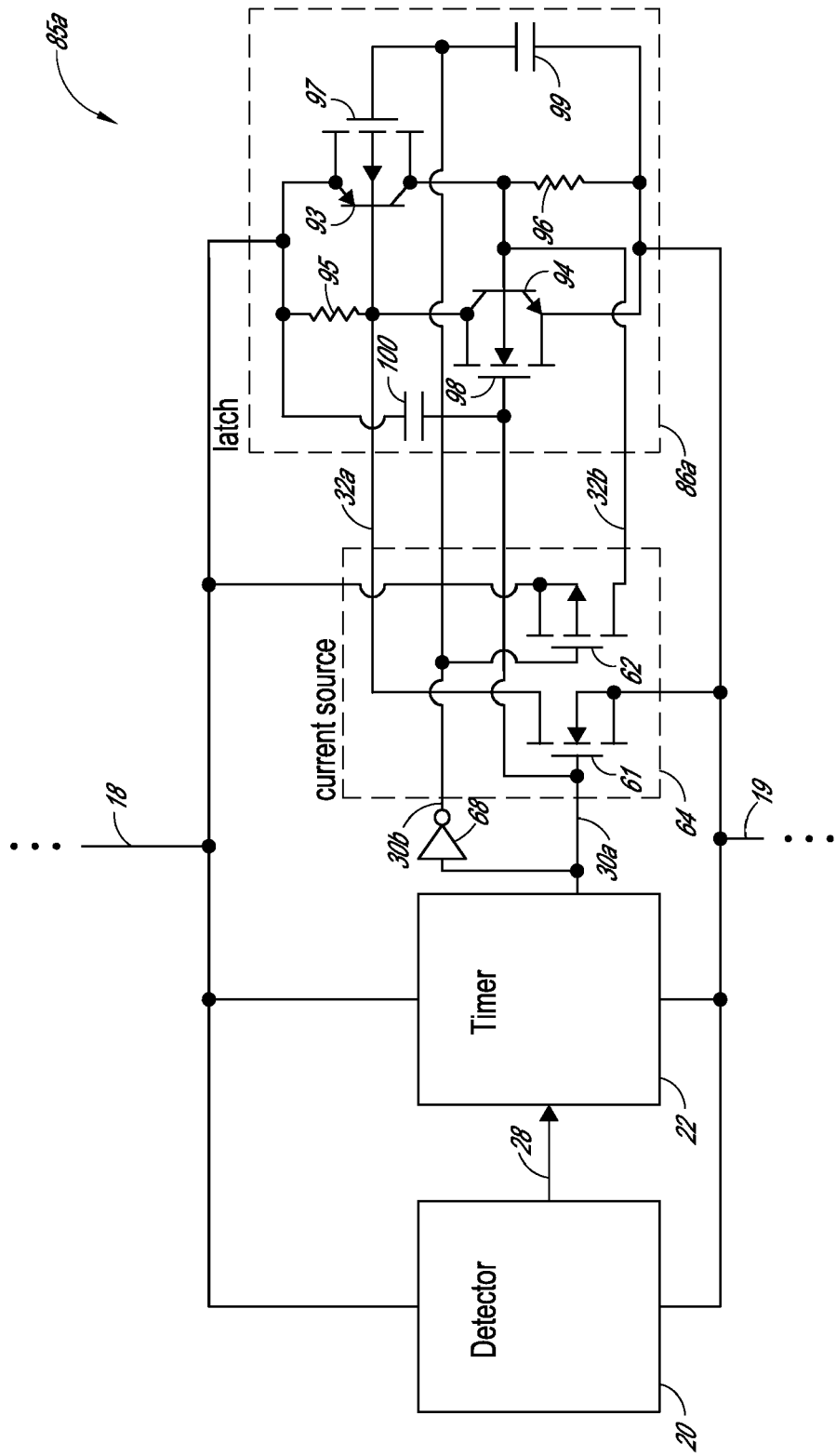
FIG. 6A is a circuit diagram illustrating an active-controlled protection circuit in accordance with yet another embodiment.

FIG. 6A is a schematic block diagram illustrating an active-controlled protection circuit 85a in accordance with yet another embodiment. The illustrated protection circuit 85a includes a detector 20, a timer 22, a current source 64, a latch 86a, and an inverter 68.

The detector 20 is electrically connected to the first node 18 and the second node 19, and is configured to provide the detection signal 28 to the timer 22. The illustrated timer 22 is electrically connected to the first and second nodes 18, 19, and is configured to generate a first current control signal 30a, which is provided to the current source 64 and to the latch 86a, as will be described below. Other details of the detector 20 and the timer 22 can be as described above in connection with FIGS. 3 and 4.

The inverter 68 includes an input adapted to receive the first current control signal 30a, and an inverting output configured to generate a second current control signal 30b. The inverter 68 provides the second current control signal 30b to the current source 64 and the latch 86a.

The current source 64 is electrically connected to first and second nodes 18, 19, and can generate first and second trigger currents 32a, 32b in response to the current control signals 30a and 30b. Other details of the current source 64 can be as described earlier in connection with FIG. 5.

The latch 86a is electrically connected to the first and second nodes 18, 19, and is configured to receive the first and second trigger currents 32a, 32b, as well as the first and second current control signals 30a, 30b. The latch 86a can include a first bipolar transistor 93, a second bipolar transistor 94, a first resistor 95, a second resistor 96, a first MOS transistor 97, a second MOS transistor 98, a first capacitor 99, and second capacitor 100. The first and second bipolar transistors 93, 94 each include an emitter, a base and collector. The first and second MOS transistors 97, 98 each include a gate, a drain, a source, and a body. In one embodiment, the body of the second MOS transistors 98 is isolated from the substrate by, for example, a deep n-well layer or buried n-type layer. As illustrated in FIG. 6A, the first and second bipolar transistors 93, 94 are PNP and NPN transistors, respectively, and the first and second MOS transistor 97, 98 are PMOS and NMOS transistors, respectively. However, a skilled artisan will appreciate that the types of the transistors 93, 94, 97, 98 can vary depending on the design of the circuit. In one embodiment, the emitter and the collector of the first bipolar transistor 93 are formed from p-type regions of the source and drain of the first MOS transistor 97, and the base of the first bipolar transistor 93 is formed from the n-type body of the first MOS transistor 97. Likewise, the emitter and the collector of the second bipolar transistor 94 can be formed from n-type regions of the source and drain of the second MOS transistor 98, and the base of the second bipolar transistor 94 can be formed from the p-type body of the second MOS transistor 98. Thus, the first and second bipolar transistors 93, 94 can be parasitic devices formed laterally underneath and operate in parallel with the first and second MOS transistors 97, 98, respectively.

The first resistor 95 includes a first end electrically connected to the first node 18, the emitter of the first bipolar transistor 93, the source of the first MOS transistor 97, and to a first end of the second capacitor 100, and a second end electrically connected to the base of the first bipolar transistor 93, to the collector of the second bipolar transistor 94, to the body of the first MOS transistor 97, to the drain of the second MOS transistor 98, and to the portion of the current source 64 providing the first trigger current 32a. The second capacitor 100 further includes a second end electrically connected to the gate of the second MOS transistor 98 and to first current control signal 30a. The second resistor 96 includes a first end electrically connected to the collector of the first bipolar transistor 93, to the drain of the first MOS transistor 97, to the base of the second bipolar transistor 94, to the body of the second MOS transistor 98, and to the portion of the current source 64 providing the second trigger current 32b. The second resistor 96 further includes a second end electrically connected to the emitter of the second bipolar transistor 94, to the second node 19, to the source of the second MOS transistor 98, and to a first end of the capacitor 99. The capacitor 99 also includes a second end, which is connected to the gate of the MOS transistor 97 and to the second current control signal 30b.

The operation of the latch 86a is similar to that described above with reference to FIG. 5, except that the second MOS transistor 98 and the second capacitor 100 are included to further aid in modulating the conductivity of the latch 86a, as will be described below.

The second MOS transistor 98 can be configured to receive the first current control signal 30a. The first current control signal 30a can be configured to increase the current flowing to the base of the first bipolar transistor 93 and to increase the bias voltage of the p-n junction between the emitter and base of the first bipolar transistor 93, thereby enhancing the conductivity of the latch 86a and lowering the activation voltage of the latch 86a. The second capacitor 100 can be utilized to couple the gate of the MOS transistor 98 to a higher voltage, thereby enhancing the channel current of the MOS transistor 98 and further enhancing the conductivity of the latch 86a. For example, if the voltage on the first node 18 were to increase suddenly in response to a transient signal event, the coupling provided by the second capacitor 100 can increase the voltage at the gate of the second MOS transistor 98, thereby increasing the current conducted by the second MOS transistor. As described above, the increased current can reduce the activation voltage of the latch 86a and can enhance the conductivity modulation of the latch 86a.

Figure 6B:
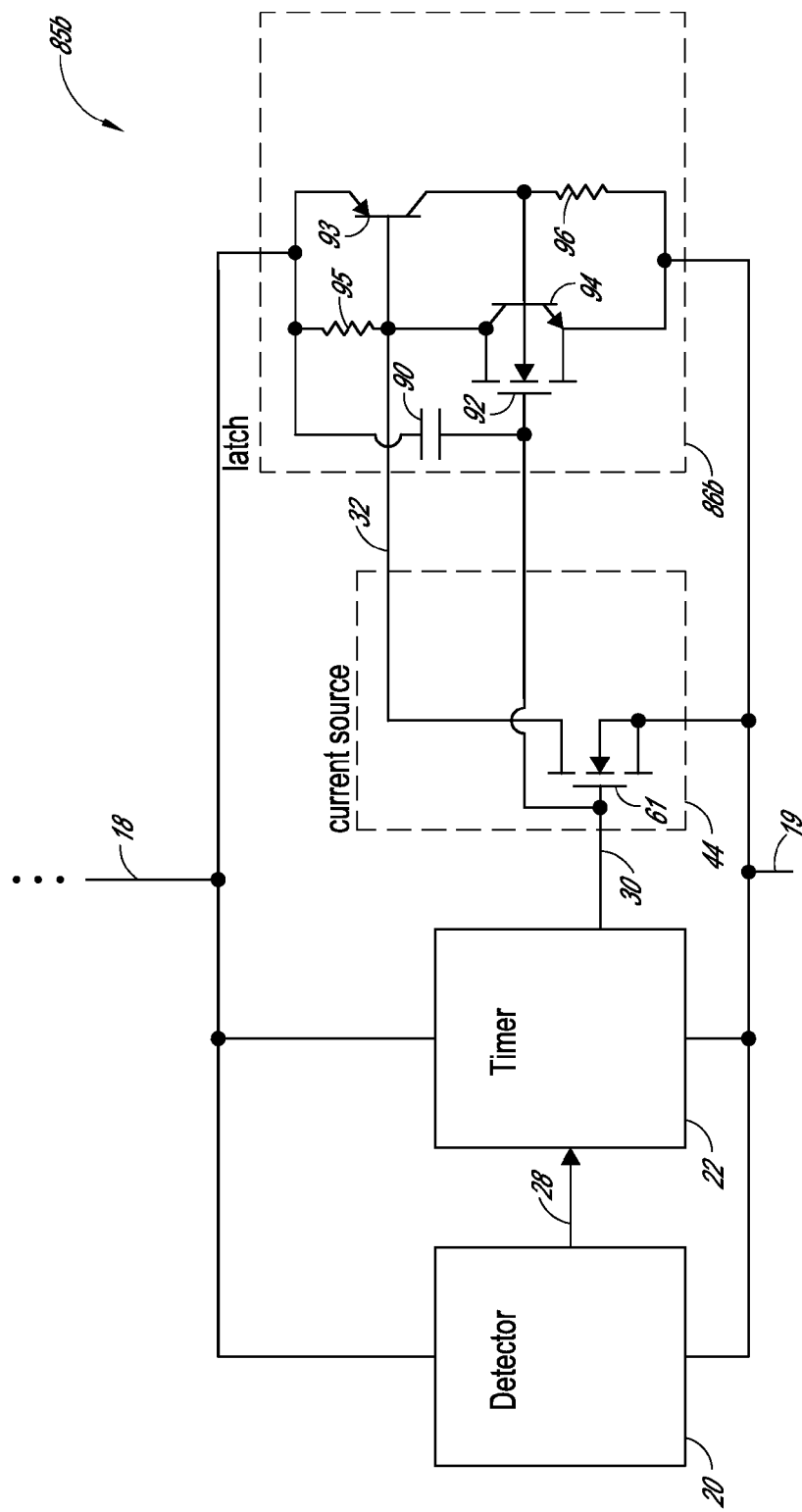
FIG. 6B is a circuit diagram illustrating an active-controlled protection circuit in accordance with yet another embodiment.

FIG. 6B is a schematic block diagram illustrating an active-controlled protection circuit 85b in accordance with yet another embodiment. The illustrated protection circuit 85b includes a detector 20, a timer 22, a current source 44, and a latch 86b.

The detector 20 is electrically connected to the first node 18 and the second node 19, and is configured to provide the detection signal 28 to the timer 22. The illustrated timer 22 is electrically connected to the first and second nodes 18, 19, and is configured to generate a current control signal 30, which is provided to the current source 44 and to the latch 86b, as will be described below. Other details of the detector 20 and the timer 22 can be as described above in connection with FIGS. 3 and 4.

The current source 44 is electrically connected to first and second nodes 18, 19, and can generate trigger current 32 in response to the current control signal 30. Other details of the current source 44 can be as described above in connection with FIG. 4.

The latch 86b is electrically connected to the first and second nodes 18, 19, and is configured to receive the trigger current 32 and the current control signal 30. The latch 86b can include a first bipolar transistor 93, a second bipolar transistor 94, a first resistor 95, a second resistor 96, a MOS transistor 92, and capacitor 90. The first and second bipolar transistors 93, 94 each include an emitter, a base and collector. As illustrated in FIG. 6B, the first and second bipolar transistors 93, 94 are PNP and NPN transistors, respectively. The MOS transistor 92 includes a gate, a drain, a source, and a body, and can be an NMOS transistor. The body of the MOS transistor 92 can be isolated from the substrate by, for example, a deep n-well layer or buried n-type layer, thereby permitting the body of the MOS transistor 92 to be biased independently of the substrate. Skilled artisan will appreciate that the types of the transistors 92, 93, 94 can vary depending on the design of the circuit. In one embodiment, the emitter and the collector of the second bipolar transistor 94 is formed from n-type regions of the source and drain of the MOS transistor 92, and the base of the second bipolar transistor 94 is formed from the p-type body of the MOS transistor 92. Thus, the second bipolar transistor 94 can be a parasitic device formed laterally underneath and operate in parallel with the MOS transistor 92.

The first resistor 95 includes a first end electrically connected to the first node 18, the emitter of the first bipolar transistor 93, and to a first end of the capacitor 90, and a second end electrically connected to the base of the first bipolar transistor 93, to the collector of the second bipolar transistor 94, to the drain of the MOS transistor 92, and to the portion of the current source 44 providing the trigger current 32. The capacitor 90 further includes a second end electrically connected to the gate of the MOS transistor 92 and to the current control signal 30. The second resistor 96 includes a first end electrically connected to the collector of the first bipolar transistor 93, to the base of the second bipolar transistor 94, and to the body of the MOS transistor 92. The second resistor 96 further includes a second end electrically connected to the emitter of the second bipolar transistor 94, to the second node 19, and to the source of the MOS transistor 92.

The MOS transistor 92 can be configured to receive the current control signal 30. The current control signal 30 can be configured to increase the current flowing to the base of the first bipolar transistor 93 and to increase the bias voltage of the p-n junction between the emitter and base of the first bipolar transistor 93, thereby enhancing the conductivity of the latch 86b and lowering the activation voltage of the latch 86b, in a manner similar to that described above with reference to FIG. 6A.

Figure 6C:
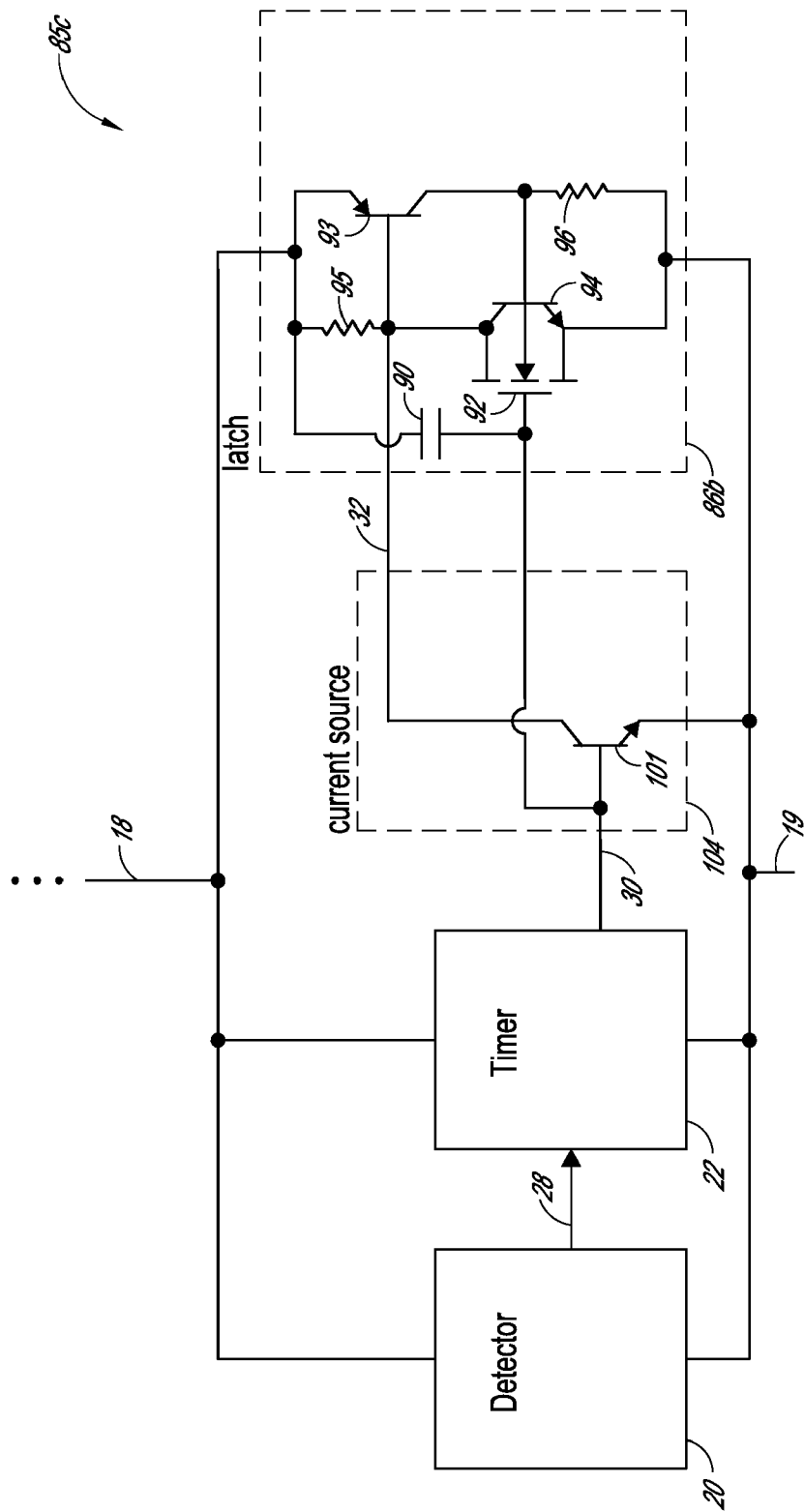
FIG. 6C is a circuit diagram illustrating an active-controlled protection circuit in accordance with yet another embodiment.

FIG. 6C is a schematic block diagram illustrating an active-controlled protection circuit 85c in accordance with yet another embodiment. The illustrated protection circuit 85c includes a detector 20, a timer 22, a current source 104, and a latch 86b.

The detector 20 is electrically connected to the first node 18 and the second node 19, and is configured to provide the detection signal 28 to the timer 22. The illustrated timer 22 is electrically connected to the first and second nodes 18, 19, and is configured to generate a current control signal 30, which is provided to the current source 104 and to the latch

86b, as will be described below. Other details of the detector 20 and the timer 22 can be as described above in connection with FIGS. 3 and 4.

The current source 104 is electrically connected to first and second nodes 18, 19, and can generate trigger current 32 in response to the current control signal 30. The current source 104 includes a bipolar transistor 101 having a base, a collector, and an emitter. The bipolar transistor 101 can be selected to be an NPN transistor, and can be configured to provide the trigger current 32 in response to the current control signal 30. A skilled artisan will appreciate that the type of the transistor 101 can vary depending on the design of the circuit. A skilled artisan will also appreciate that the illustrated current source 104 is merely exemplary, and a variety of other current sources could be employed to generate one or more trigger currents, as described above with reference to FIGS. 4-6B.

The latch 86b is electrically connected to the first and second nodes 18, 19, and is configured to receive the trigger current 32 and the current control signal 30. Additional details of the latch 86b can be as described above in connection with FIG. 6B.

With reference to FIGS. 4-6C, although the latch has been illustrated in the context of certain configurations, skilled artisans will appreciate that enhanced conductivity modulation can be achieved by providing a trigger current to a multitude of latch configurations. Thus, not all of the illustrated components are necessary, and one or more additional components have been omitted for simplicity. For example, with reference to FIG. 6A, one or more of the first and second capacitors 99, 100, first and second MOS transistors 97, 98, and first and second resistors 95, 96 can be omitted. Additionally, in certain embodiments, one or more components, such as the first current source transistors 61 and/or the second current source transistor 62, can be integrated into the latch. For example, the first MOS transistor 97 can have a gate, drain and source electrically connected in a similar manner as the gate, drain and source of the second current source transistor 62, and thus, the first MOS transistor 97 can operate as the second current source transistor 62. This can be desirable when the level of the trigger current is relatively small, such that the capacitive loading from the body of the first MOS transistor 97 does not unduly inhibit the speed at which the latch transitions from the high-impedance state to the low impedance state Likewise, in certain embodiments the second MOS transistor 98 can have a gate, drain and source electrically connected in a similar manner as the gate, drain and source of the first current source transistor 61, and the second MOS transistor 98 can be employed to operate as the first current source transistor 61. The omission of one or more components from the latch or the integration of one or more MOS transistors from the current source into the latch can be desirable to reduce the layout area of the protection circuit.

Figure 7:
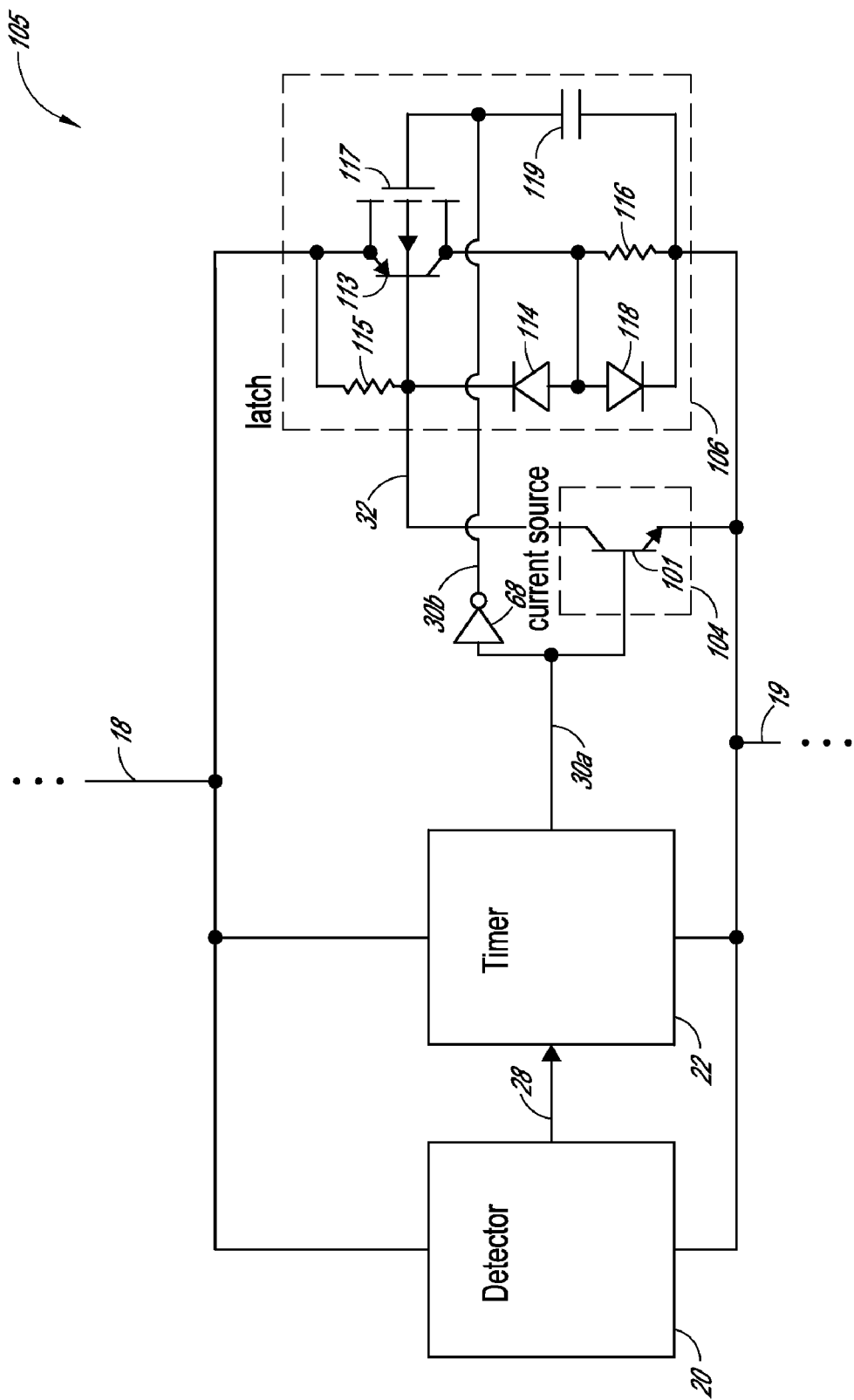
FIG. 7 is a circuit diagram illustrating a protection circuit in accordance with yet another embodiment.

FIG. 7 is a schematic block diagram illustrating an active-controlled protection circuit 105 in accordance with yet another embodiment. The illustrated protection circuit 105 includes a detector 20, a timer 22, a current source 104, a latch 106, and an inverter 68.

The detector 20 is electrically connected to the first node 18 and the second node 19, and is configured to provide the detection signal 28 to the timer 22. The timer 22 is electrically connected to the first and second nodes 18, 19, and is configured to generate a first current control signal 30a, which is provided to the current source 104 and to the inverter 68, as will be described below. Other details of the detector 20 and the timer 22 can be as described above in connection with FIGS. 3 and 4.

The inverter 68 includes an input adapted to receive the first current control signal 30a, and an inverting output configured to generate a second current control signal 30b. The inverter 68 provides the second current control signal 30b to the latch 106.

The current source 104 is electrically connected to first and second nodes 18, 19, and can generate trigger current 32 in response to the current control signal 30a. Other details of the current source 104 can be as described above in connection with FIG. 6C.

The latch 106 is electrically connected to the first and second nodes 18, 19, and is configured to receive the trigger current 32, as well as second current control signal 30b. The illustrated protection circuit 105 includes the latch 106. As shown in FIG. 7, the latch 106 includes a bipolar transistor 113, a first resistor 115, a second resistor 116, a MOS transistor 117, a first diode 114, a second diode 118, and a capacitor 119.

The first and second diodes 114, 118 each include an anode and a cathode. The bipolar transistor 113 includes an emitter, a base and collector, and the MOS transistor 117 includes a gate, a drain, a source, and a body. In the illustrated embodiment, the bipolar transistor 113 is a PNP transistor, and the MOS transistor 117 is a PMOS transistor. The bipolar transistor 113 can be a parasitic device formed laterally underneath the MOS transistor 117 and can be configured to operate in parallel with the MOS transistor 117 in a manner similar to that described above with reference to FIG. 5. A skilled artisan will appreciate that the types of the transistors 113, 117 can vary depending on the design of the circuit.

The first resistor 115 includes a first end electrically connected to the first node 18, the emitter of the bipolar transistor 113, and the source and body of the MOS transistor 117, and a second end electrically connected to the base of the bipolar transistor 113, to the cathode of the first diode 114, and to the portion of the current source 104 providing the trigger current 32. The second resistor 116 includes a first end electrically connected to the collector of the bipolar transistor 113, to the anode of the first diode 114, to the anode of the second diode 118, and a second end electrically connected to the cathode of the second diode 118, to the second node 19, and to a first end of the capacitor 119. The capacitor 119 also includes a second end, which is connected to the gate of the MOS transistor 117 and to and to the second current control signal 30b.

The illustrated latch 106 can be configured to have a low-impedance state corresponding to the activation of the p-n junction between the emitter and the base of the bipolar transistor 113. Although the illustrated latch 106 lacks cross-coupled bipolar transistors in a feedback configuration, the latch 106 can be configured to clamp at a preselected activation voltage. Additionally, the latch 106 can sustain a relatively high on-state holding voltage, which can be desirable for certain clamping circuit applications. The holding voltage can be defined by the feedback loop and injection provided by the first and second diodes 114, 118 and the common-emitter gain "β" of the bipolar transistor 113. The current source 104 can be configured to inject the trigger current 32 into the latch 106, thereby decreasing the activation voltage of the latch 106. The trigger current 32 can include a first portion which is directed through the first resistor 115 and which can forward bias the p-n junction between the emitter and base of the bipolar transistor 113, thereby stimulating an amplified flow of current from the collector of the bipolar transistor 113. The trigger current 32 can also include a second portion which is provided to the base of the transistor 113, which can be configured to stimulate the base current of the bipolar transistor 113, which can lead to an amplification of the collector current of the bipolar transistor 113. The collector current of the bipolar transistor 113 can flow through the second diode 118 and the second resistor 116, which can increase the current flow between the first and second nodes 18, 19, thereby enhancing the conductivity of the latch. The current flow can be further increased by the MOS transistor 117, which can be configured to conduct a channel current. The channel current of the MOS transistor 117 can be further enhanced by the inclusion of the capacitor 119, which can lower the gate voltage of the transistor 117 in a manner similar to that described above with reference to FIG. 5.

Figure 8:
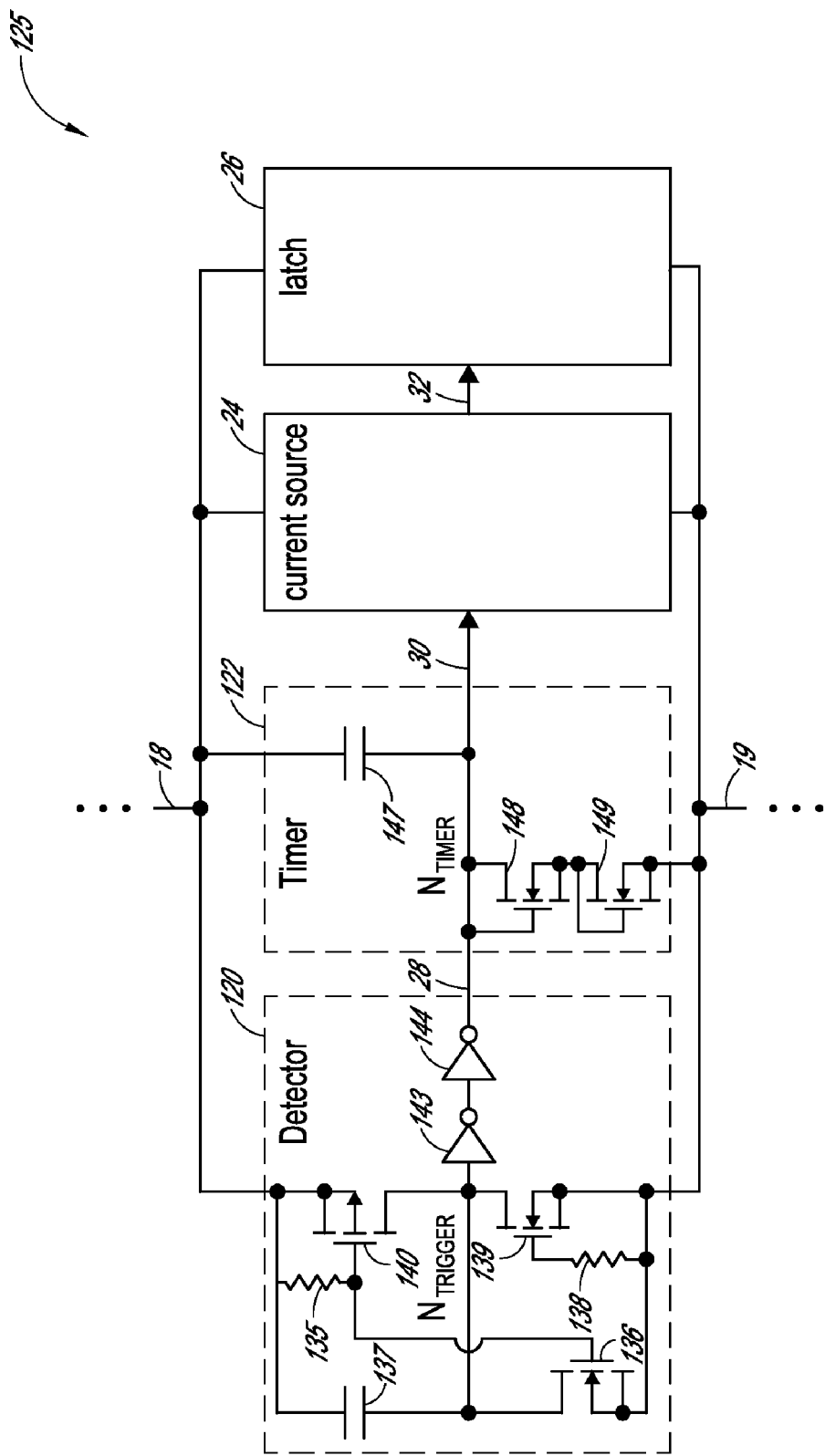
FIG. 8 is a circuit diagram illustrating a protection circuit in accordance with some embodiments.

FIG. 8 is a schematic block diagram illustrating an active-controlled protection circuit in accordance with some embodiments. The illustrated protection circuit 125 includes the detector 120, the timer 122, the current source 24 and the latch 26. The illustrated detector 120 is electrically connected to the first node 18 and the second node 19, and is configured to provide the detection signal 28 to the timer 122. The illustrated timer 122 is electrically connected to the first and second nodes 18, 19, and is configured to generate a current control signal 30, which is provided to the current source 24. The illustrated latch 26 is electrically connected to the first and second nodes 18, 19, and is configured to receive the trigger current 32. Various embodiments of the current source 24 and the latch 26 were described above with reference to FIGS. 4-7.

The illustrated detector 120 includes a first resistor 135, a first transistor 136, a capacitor 137, a second resistor 138, a second transistor 139, a third transistor 140, a first inverter 143, and a second inverter 144. The illustrated first and second transistors 136, 139 are NMOS transistors and the third transistor 140 is a PMOS transistor, each having a drain, a gate, a source and a body. The bodies of the NMOS transistors 136, 139 can be separated from the substrate by a deep n-well or buried n-type layer. A skilled artisan will appreciate that the types of the transistors 136, 139, 140 can vary depending on the design of the circuit.

The first resistor 135 includes a first end electrically connected to the first node 18, the source and body of third transistor 140, and a first end of the capacitor 137, and a second end electrically connected to the gates of the first and third transistors 136, 140. The capacitor 137 also includes a second end connected to a node labeled $N_{TRIGGER}$, which electrically connects the second end of the capacitor 137 to the input of the first inverter 143 and the drains of first, second, and third transistors 136, 139 and 140. As shown in FIG. 8, the second resistor 138 includes a first end electrically connected to the gate of the second transistor 139 and a second end electrically connected to the second node 19 and the sources and bodies of first and second transistors 136, 139. The second inverter 144 has an input connected to the inverting output of the first inverter 143, and an output configured to provide the detection signal 28.

The detector 120 can be configured to provide the detection signal 28 when a transient signal event satisfying one or more signaling conditions is detected. In the illustrated embodiment, the detector 120 is configured to detect changing voltage on the first node 18. However, persons of ordinary skill in the art will appreciate that the detector can be configured to monitor a transient signal based on a multitude of detection conditions indicative of a transient signal's potential to damage sensitive electronics, including but not limited to, measurements of power, voltage, and/or charge.

The illustrated detector 120 can be configured to receive a voltage on the first node 18 which is at a higher voltage than the voltage received on the second node 19. For example, the illustrated detector 120 can be used in the configuration illustrated in FIG. 2A, and can be used to detect transient signal events on the first node 18 having a rate of voltage exceeding a threshold.

When a transient signaling event is not present, the second and third transistors 139, 140 can have gate-source voltages of about 0 V, and can be in a cutoff mode of operation in which the second and third transistors 139, 140 conduct a minimal amount of current. When the voltage difference between the first and second nodes 18, 19 is greater than the threshold voltage $V_{th}$ of the first transistor 136, the first transistor 136 pulls the node $N_{TRIGGER}$ to a voltage substantially equal to the voltage of the second node 19. The trip point of the first inverter 143 can be configured to be above the voltage of the second node 19 so that the detector 120 begins in a state in which the second inverter 144 provides a detection signal 28 indicative of a transient signal event not being present.

With continuing reference to FIG. 8, the capacitor 137 can couple the node $N_{TRIGGER}$ in response to voltage changes on the first node 18. The illustrated detector 120 can be configured to detect positive voltage changes on the first node 18 having a rate of change exceeding a threshold. For example, when the first node 18 experiences a sudden increase in voltage, the coupling provided by the capacitor 137 raises the voltage on the node $N_{TRIGGER}$. As the rate of change of the first node 18 (dV/dt) increases, the current injected by the capacitor 137 can be about $I_C=C*dV/dt$. If the first node 18 experiences a rate of change of voltage of a certain magnitude for a long enough duration, the capacitor 137 can raise voltage of the node $N_{TRIGGER}$ to a level above the trip point of the first inverter 143, thereby changing the state of the detection signal 28. As described above, the first transistor 136 can be configured to pull the node $N_{TRIGGER}$ to a voltage substantially equal to the voltage of the second node 19. By configuring the driving strength of the first transistor 136 to have a desired channel resistance, an RC time constant on the node $N_{TRIGGER}$ can be produced from the first transistor 136 and the capacitor 137. Thus, the detector 120 can be configured to produce the detection signal 28 in response to transient signal event having a change of voltage meeting a selected first condition corresponding to the rate of change of voltage of the first node 18.

In one embodiment, the third transistor 140 can be configured to provide overvoltage protection for the gate of the inverter 143. In particular, if a high-speed transient signal event on the first node 18 caused the node $N_{TRIGGER}$ to reach a voltage exceeding the nominal operating voltage range of the first node 18, the third transistor 140 can provide a current from the node $N_{TRIGGER}$ to the first node 18 which can lower the voltage of the node $N_{TRIGGER}$ to a voltage value which does not endanger the gates of the inverter 143 from overvoltage damage. Thus, as described above the third transistor 140 can be configured to be in a cutoff mode of operation corresponding to a minimal conduction of current when a transient signaling event is not present, and can be configured to lower the voltage of the node $N_{TRIGGER}$ if a transient signal event on the first node 18 couples the node $N_{TRIGGER}$ to a voltage exceeding about the nominal voltage on the first node 18 plus the threshold voltage of the third transistor 140 Likewise, the second transistor 139 can be configured to raise the voltage of the node $N_{TRIGGER}$ to a voltage value which does not endanger the gates of the inverter 143 from overvoltage damage should the voltage on the node $N_{TRIGGER}$ fall below a voltage less than about the nominal voltage on the second node 19 minus the threshold voltage of the second transistor 139. This can occur, for example, when a negative going transient signal event occurs on the second node 19, and causes the first transistor 136 to conduct a current from the node $N_{TRIGGER}$ to the second node 19 which can serve to lower the voltage on the node $N_{TRIGGER}$.

The illustrated timer 122 includes the timer capacitor 147, first timer transistor 148, and second timer transistor 149. As shown in FIG. 8, the timer 122 can receive the detection signal 28 from the detector 120 and provide the current control signal 130 to the current source 24. The first and second timer transistors 148, 149 are NMOS transistors and each has a drain, gate, source, and body. The bodies of the first and second timer transistors 148, 149 can be separated from the substrate by a deep n-well or buried n-type layer, and thus the bodies of the first and second timer transistors 148, 149 can be biased independently of the substrate. The timer capacitor 147 includes a first end electrically connected to the first node 18, and a second end electrically connected to a node labeled $N_{TIMER}$, which electrically connects the second end of the timer capacitor 147 to the detection signal 28, the current control signal 30, and the gate and drain of the first timer transistor 148. The body and source of the first timer transistor 148 are electrically connected to the gate and drain of the second timer transistor 149, while the body and source of the second timer transistor 149 are electrically connected to the second node 19.

In one embodiment, the timer 122 can be configured to receive a voltage on the first node 18 which is at a voltage higher than the voltage received on the second node 19. For example, the illustrated timer 122 can be used in the configuration illustrated in FIG. 2A, and can be to provide a current control signal 30 in response to a transient signal event on the first node 18 having a rate of voltage exceeding a threshold. When a transient signaling event is not present, the detector 120 can drive the node $N_{TIMER}$ to a voltage equal to about the second node 19. Thus, the first and second timer transistors 148, 149 can have gate-source voltages of about 0 V, and can be in a cutoff mode of operation in which the first and second timer transistors 148, 149 conduct a minimal amount of current.

In response to a transient signal event which increases the voltage on the first node 18, the timer capacitor 147 can couple the voltage on the node $N_{TIMER}$ upwards, thereby providing a current control signal 30 to the current source 24. The current control signal 30 can direct the current source 24 to provide the trigger current 32, as was described above with reference to FIGS. 3-7. As described above, the detector 120 can be configured to assert the detection signal 28 in response to a transient signal event satisfying one or more signaling conditions. Thus, in response to a qualifying transient signal event, the detector 120 can aid the timer 122 in providing the current control signal 30. After a duration determined by design of the detector 120, the detector 120 can change the state of the detection signal 28. In the illustrated embodiment, the current control signal 30 decreases in amplitude corresponding to an RC time constant determined by the drive strength of the detector 120 and the timer capacitor 147.

The first and second timer transistors 148, 149 provide overvoltage protection for circuitry contained in the current source 24 and/or the latch 26. For example, the first and second timer transistors 148, 149 can conduct a current from the node $N_{TIMER}$ to the second node 19 when the voltage on the node $N_{TIMER}$ exceeds the nominal voltage of the second node 19 by a selected amount. In the illustrated embodiment, as the voltage on the node $N_{TIMER}$ begins to exceed a voltage greater than the sum of the threshold voltages of the first and second timer transistors 148, 149, the first and second timer transistors 148, 149 can be configured to operate out of a cutoff mode and can conduct a current which can lower the voltage on the node $N_{TIMER}$. Thus, the timer transistors 148, 149 can provide overvoltage protection. Skilled artisans will recognize that a wide variety of protection circuits can be utilized, and that this example is merely illustrative.

Persons of ordinary skill in the art will recognize that a wide variety of detector and timer circuits exists in the art, and that the detector 120 and the timer 122 are merely illustrative. A vast number of detection circuits exist in the art, ranging from relatively simple circuits involving capacitive coupling to more complicated circuits utilizing amplifiers. Additionally, a wide variety of both analog and digital circuits exists which can be configured to receive an input (for example, the detection signal 28) and provide an output (for example, the current control signal 30) having a timing relationship to the input. For example, skilled artisans will appreciate that a timer circuit can designed utilizing transistor gate delays, capacitive coupling, mux structures, or a variety of other well-known techniques.

Figure 9:
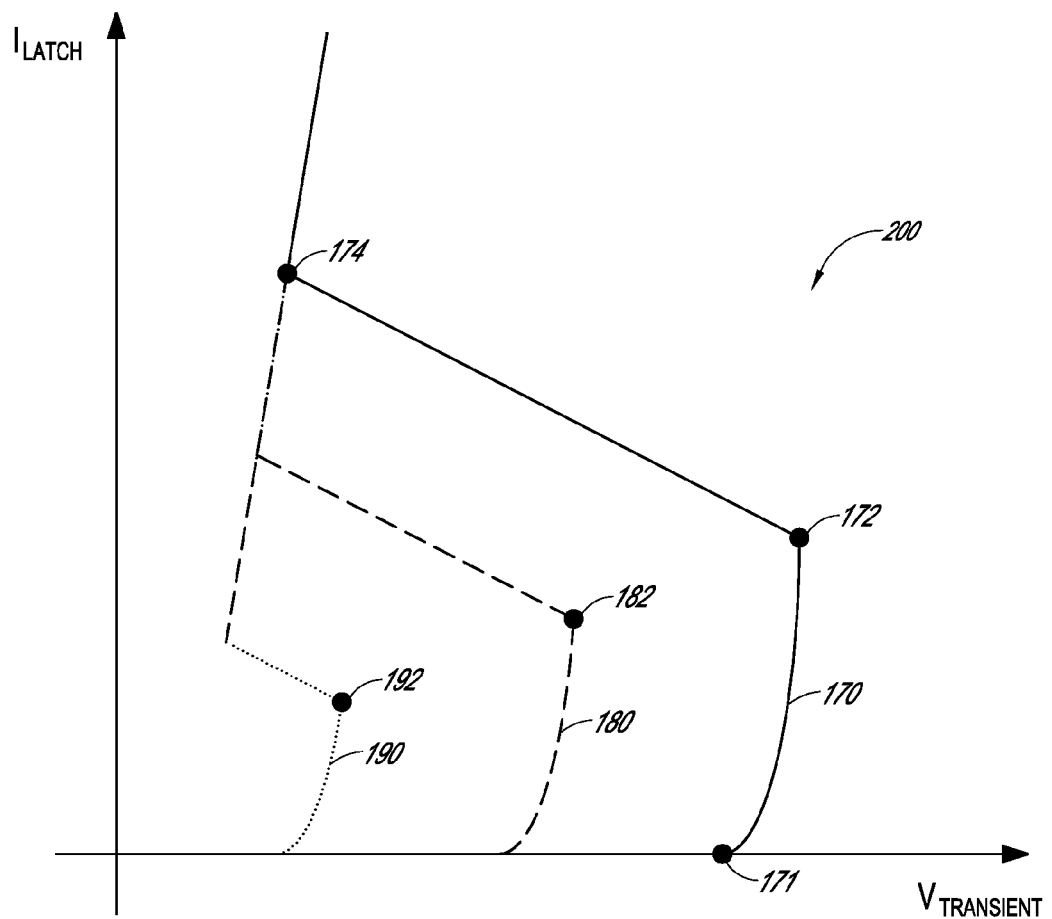
FIG. 9 is a graph of latch current versus transient voltage illustrating three examples of trigger current conditions.

FIG. 9 is a graph of latch current versus transient voltage illustrating three examples of trigger current conditions. The graph 200 shows the latching current, for example, the current through the latch 26, as the amplitude of the voltage of a transient signal voltage increases for three trigger current conditions, illustrated as a first I-V curve 170, a second I-V curve 180, and a third I-V curve 190.

The first I-V curve 170 can represent the current through the latch 26 as the transient voltage increases for a first case in which no trigger current control is provided. For example, the first I-V curve 170 can correspond to the case in which the latch 26 is used without the detector 20, the timer 22, and the current source 24. As shown in FIG. 9, current drawn by the latch can be at a relatively small value until the voltage of the transient signal reaches the first voltage level 171. Thus, the transient voltage can achieve potentially dangerous amplitude before a significant latching current is conducted. As the voltage of the transient signal increases beyond the first voltage level 171, the current drawn by the latch can increase until the first I-V point 172 is reached. Upon reaching the first I-V point 172, regenerative feedback can be obtained and the latch can enter a low-impedance state, as was described above with reference to FIG. 4. At this point, the activation voltage of the latch has been reached, and the latch can draw a substantial current over a wide range of transient voltage levels, as can be seen by the portion of the first I-V plot between the first I-V point 172 and the second I-V point 174.

With continuing reference to FIG. 9, the second I-V curve 180 can represent the current through the latch 20 as the transient voltage increases for a second case in which a trigger current of a first magnitude is applied. For example, the second I-V curve 180 can correspond to an embodiment of FIG. 3 in which a trigger current of a first magnitude is selected. As shown in FIG. 9 by a comparison between the first and second I-V curves 170, 180, providing a trigger current of a first magnitude can shift the point at which the latch enters a low-impedance state downward. With reference back to FIG. 3, the protection circuit 15 can begin in a condition in which no trigger current 32 is provided to the latch 26. This condition can correspond to a low-leakage/high-impedance state. Upon detection of a transient signal event meeting one or more signaling conditions, the trigger current can be provided to the latch 26, thereby enhancing the conductivity modulation of the latch 26 and selectively lowering the activation voltage and corresponding activation current of the latch 26 in anticipation of a potentially IC-damaging transient signal event. Thus, the latch 26 can effectively switch from one I-V curve (for example, 170) to another (for example 180) in response to the trigger current. After the transient signal event passes, the latch 26 of the protection circuit 15 can return to a low-leakage/high-impedance state. This dynamic approach offers reduced power-consumption and current leakage over an approach in which a static trigger current is provided to the latch 26 to enhance conductivity modulation and to selectively control activation voltage.

The third I-V curve can represent current through the latch 20 for a third case in which a trigger current of a second magnitude is applied, where the second magnitude is selected to be greater than the first magnitude. Thus, as shown in FIG. 9, providing a trigger current of an increased value can further lower the activation voltage and corresponding activation current at which the latch enters the low-impedance state. Additionally, the activation voltage of the latch can be selectively decreased even further by providing gate control to one or more MOS transistors within the latch, as shown in FIGS. 5-6C. Accordingly, graph 200 illustrates how providing a trigger current to a latch and, optionally, providing gate control to one or more MOS transistors within the latch, can be used to selectively lower the activation voltage and current of the latch, thereby providing transient signal voltage protection for predetermined transient signal events exceeding a selected voltage. By selecting the magnitude of the trigger current, for example, during design, the protection circuit can be configured to have the desired combination of leakage current in the high-impedance state, current in the low-impedance state, and activation voltage.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Applications

Devices employing the above described schemes can be implemented into various electronic devices. Examples of the electronic devices can include, but are not limited to, consumer electronic products, parts of the consumer electronic products, electronic test equipment, etc. Examples of the electronic devices can also include memory chips, memory modules, circuits of optical networks or other communication networks, and disk driver circuits. The consumer electronic products can include, but are not limited to, a mobile phone, a telephone, a television, a computer monitor, a computer, a hand-held computer, a personal digital assistant (PDA), a microwave, a refrigerator, an automobile, a stereo system, a cassette recorder or player, a DVD player, a CD player, a VCR, an MP3 player, a radio, a camcorder, a camera, a digital camera, a portable memory chip, a washer, a dryer, a washer/dryer, a copier, a facsimile machine, a scanner, a multi functional peripheral device, a wrist watch, a clock, etc. Further, the electronic device can include unfinished products.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

What is claimed is:

1. An apparatus for providing transient protection, the apparatus comprising:
    a detector configured to detect a presence of a transient signal at a first node, wherein the detector is configured to activate a detected state of a detection signal upon detection of the transient signal;
    a timer configured to activate a control signal for a first duration of time based at least partly on a state of the detection signal;
    a current source configured to modify a trigger current at least partly in response to a state of the control signal, wherein the trigger current is configured to be modified to at least two different current levels; and
    a latch having a low-impedance state and a high-impedance state, wherein the latch is configured to receive the trigger current as an input, wherein the latch is configured to conduct a latch current from the first node to a second node when the latch is in the low-impedance state, and wherein the latch is further configured to transition from the high-impedance state to the low-impedance state for a first activation voltage of the transient signal when the trigger current is at a first current level and to transition from the high-impedance state to the low-impedance state for a second activation voltage of the transient signal when the trigger current is at a second current level having a magnitude greater than the first current level, and wherein the first activation voltage is greater than the second activation voltage, and wherein the latch is further configured to receive the control signal, and wherein the latch is further configured to transition from the high-impedance state to the low-impedance state for a third activation of the transient signal when the trigger current is at the second level and the control signal is activated, wherein the second activation voltage is greater than the third activation voltage.

2. The apparatus of claim 1, wherein the first current level is equal to about zero amps.

3. The apparatus of claim 1, wherein the latch comprises a first transistor having a base configured to receive at least a portion of the trigger current.

4. The apparatus of claim 3, wherein the first transistor further includes a collector, and wherein the latch further includes a second transistor having a collector and a base, and wherein the base of the first transistor is electrically connected to the collector of the second transistor and the collector of the first transistor is electrically connected to the base of the second transistor.

5. The apparatus of claim 4, wherein the first transistor further includes an emitter electrically connected to the first node, and wherein the second transistor further includes an emitter electrically connected to the second node.

6. The apparatus of claim 5, wherein the latch further comprises a third transistor having a source and a drain, and wherein the source is electrically connected to the emitter of the second transistor, and wherein the drain is electrically connected to the collector of the second transistor.

7. The apparatus of claim 6, wherein the first transistor is a PNP bipolar transistor, the second transistor is a NPN bipolar transistor, and the third transistor is a NMOS transistor.

8. The apparatus of claim 7, wherein the second transistor is a parasitic device of the third transistor.

9. The apparatus of claim 7, wherein the third transistor further includes a gate, wherein the gate is adapted to receive the control signal.

10. The apparatus of claim 9, wherein the latch further includes a capacitor having a first end and a second end, wherein the first end is electrically connected to the gate of the third transistor and wherein the second end is electrically connected to the second node.

11. The apparatus of claim 9, further comprising control logic having at least one input and at least one output, and a fourth transistor having a gate, a drain, and a source, wherein an input of the control logic is adapted to receive the control signal and the gate of the fourth transistor is adapted to receive an output of the control logic, and wherein the source of the fourth transistor is electrically connected to the emitter of the first transistor and the drain of the fourth transistor is electrically connected to the collector of the first transistor.

12. The apparatus of claim 5, further comprising control logic having at least one input and at least one output, wherein an input of the control logic is adapted to receive the control signal, and wherein the first transistor is a PNP bipolar transistor and the second transistor is a NPN bipolar transistor, and wherein the latch further comprises a fourth transistor having a gate, a source, and a drain, and wherein the source is electrically connected to the emitter of the first transistor, the drain is electrically connected to the collector of the first transistor, and the gate is configured to receive an output of the control logic, and wherein the fourth transistor is a PMOS transistor.

13. The apparatus of claim 12, wherein the first transistor is a parasitic device of the fourth transistor.

14. The apparatus of claim 5, wherein the apparatus further comprising a diode having a cathode and an anode, wherein the cathode is electrically connected to the emitter of the first transistor and the anode is electrically connected to a third node.

15. The apparatus of claim 14, wherein the second node and the third node are the same node.

16. The apparatus of claim 3, wherein the first transistor further includes a collector, and wherein the first transistor is a PNP bipolar transistor, and wherein the latch further includes a first diode having an anode and a cathode and a second diode having an anode and a cathode, wherein the cathode of the first diode is electrically connected to the base of the first transistor, the anode of the first diode is electrically connected to the anode of the second diode and to the collector of the first transistor, and the cathode of the second diode is electrically connected to the second node.

17. The apparatus of claim 1, wherein the current source includes a transistor having a gate and a drain, and wherein the gate is adapted to receive the control signal and wherein the drain is adapted to provide at least a portion of the trigger current.

18. The apparatus of claim 17, wherein the transistor of the current source is integrated into the latch.

19. The apparatus of claim 17, wherein the transistor of the current source is a NMOS transistor.

20. The apparatus of claim 1, wherein the current source includes a NPN bipolar transistor having a base and a collector, wherein the base is adapted to receive the control signal and wherein the collector is adapted to provide at least a portion of the trigger current.

21. The apparatus of claim 1, wherein the detector is configured to detect the presence of the transient signal by measuring a voltage level of the transient signal.

22. The apparatus of claim 1, wherein the detector is configured to detect the presence of the transient signal by measuring a rate of change of a voltage level of the transient signal.

23. The apparatus of claim 1, wherein the first duration of time is longer than a duration of time the latch takes to transition from the high-impedance state to the low-impedance state.

24. The apparatus of claim 1, wherein at least one of the first node and the second node is electrically connected to a bonding pad of an integrated circuit.

25. The apparatus of claim 24, wherein the first node is electrically connected to the bonding pad and the second node is electrically connected to a ground node of the integrated circuit.

26. A method for providing transient signal protection, the method comprising:
 detecting the presence of a transient signal;
 activating a control signal for a first duration of time at least partly in response to the transient signal;
 providing the control signal to a current source;
 modifying a trigger current of the current source at least partly in response to the control signal, wherein the trigger current is configured to be modified to at least two different current levels;
 providing a latch having a low-impedance state and high-impedance state; and
 providing at least a portion of the trigger current into the latch, wherein the latch is configured to transition from the high-impedance state to the low-impedance state for a first activation voltage of the transient signal when the trigger current is at a first current level and to transition from the high-impedance state to the low-impedance state for a second activation voltage of the transient signal when the trigger current is at a second current level having a magnitude greater than the first current level, and wherein the first activation voltage is greater than the second activation voltage; and providing the control signal to the latch, wherein the latch is further configured to transition from the high-impedance state to the low-impedance state form a third activation voltage of the transient signal when the trigger current is at the second level and the control signal is activated, wherein the second activation voltage is greater than the third activation voltage.

27. The method of claim 26, wherein the latch includes a first transistor having a base, and further comprising providing at least a portion of the trigger current into the base of the first transistor.

28. The method of claim 26, detecting the presence of a transient signal includes comparing the amplitude of a voltage of the transient signal to a threshold voltage.

29. The method of claim 26, detecting the presence of a transient signal includes comparing a rate of change of a voltage of the transient signal to a threshold.

30. The method of claim 26, further comprising deactivating the control signal when the latch is in the low-impedance state.

31. The method of claim 26, wherein the transient signal is an electrostatic discharge event.

32. The method of claim 26, further comprising generating a collector current from a collector of the first transistor at least partly in response to the trigger current, and providing the collector current to a base of a second transistor.

33. The method of claim 32, further comprising providing a third transistor having a gate and a drain, providing the control signal to the gate, generating an enhancement current of the drain at least partly in response to the detection signal, and providing the enhancement current to the base of the first transistor.

* * * * *